United States Patent
Singh et al.

(10) Patent No.: US 11,308,353 B2
(45) Date of Patent: Apr. 19, 2022

(54) CLASSIFYING DIGITAL IMAGES IN FEW-SHOT TASKS BASED ON NEURAL NETWORKS TRAINED USING MANIFOLD MIXUP REGULARIZATION AND SELF-SUPERVISION

(71) Applicant: Adobe Inc., San Jose, CA (US)

(72) Inventors: Mayank Singh, Noida (IN); Puneet Mangla, Faridabad (IN); Nupur Kumari, Noida (IN); Balaji Krishnamurthy, Noida (IN); Abhishek Sinha, Noida (IN)

(73) Assignee: Adobe Inc., San Jose, CA (US)

( * ) Notice: Subject to any disclaimer, the term of this patent is extended or adjusted under 35 U.S.C. 154(b) by 261 days.

(21) Appl. No.: 16/661,617

(22) Filed: Oct. 23, 2019

(65) Prior Publication Data

US 2021/0124993 A1    Apr. 29, 2021

(51) Int. Cl.
  *G06K 9/62*   (2006.01)
  *G06N 20/00*  (2019.01)
  *G06N 3/08*   (2006.01)

(52) U.S. Cl.
  CPC .......... *G06K 9/6256* (2013.01); *G06K 9/628* (2013.01); *G06K 9/6232* (2013.01); *G06K 9/6277* (2013.01); *G06K 9/6286* (2013.01); *G06N 3/084* (2013.01); *G06N 20/00* (2019.01)

(58) Field of Classification Search
  CPC .. G06K 9/6256; G06K 9/6232; G06K 9/6277; G06K 9/628; G06K 9/6286; G06N 20/00; G06N 3/084

USPC ........................................................ 382/224
See application file for complete search history.

(56) References Cited

U.S. PATENT DOCUMENTS

2020/0160593 A1* 5/2020 Gu ........................ G06T 9/002
2021/0113078 A1* 4/2021 Hamrah ............... A61B 3/1025

OTHER PUBLICATIONS

M. Andrychowicz, M. Denil, S. Gomez, M. W. Hoffman, D. Pfau, T. Schaul, B. Shillingford, and N. De Freitas. Learning to learn by gradient descent by gradient descent. In Advances in neural information processing systems, pp. 3981-3989, 2016.
Y. Bengio, A. Courville, and P. Vincent. Representation learning: A review and new perspectives. IEEE transactions on pattern analysis and machine intelligence, 35(8):1798-1828, 2013.
L. Bertinetto, J. F. Henriques, P. H. Torr, and A. Vedaldi. Meta-learning with differentiable closed-form solvers. ICLR, 2018.

(Continued)

*Primary Examiner* — Michael R Neff
(74) *Attorney, Agent, or Firm* — Keller Preece PLLC

(57) ABSTRACT

The present disclosure relates to systems, methods, and non-transitory computer readable media for training a classification neural network to classify digital images in few-shot tasks based on self-supervision and manifold mixup. For example, the disclosed systems can train a feature extractor as part of a base neural network utilizing self-supervision and manifold mixup. Indeed, the disclosed systems can apply manifold mixup regularization over a feature manifold learned via self-supervised training such as rotation training or exemplar training. Based on training the feature extractor, the disclosed systems can also train a classifier to classify digital images into novel classes not present within the base classes used to train the feature extractor.

20 Claims, 10 Drawing Sheets

(56) References Cited

OTHER PUBLICATIONS

C. M. Bishop. Neural networks for pattern recognition. Oxford university press, 1995.
M. Caron, P. Bojanowski, A. Joulin, and M. Douze. Deep clustering for unsupervised learning of visual features. In ECCV, 2018.
W.-Y.Chen,Y.-C.Liu,Z.Kira,Y.-C.Wang,andJ.-B.Huang. A closer look at few-shot classification. In International Conference on Learning Representations, 2019.
T. DeVries and G. W. Taylor. Improved regularization of convolutional neural networks with cutout. arXiv preprint arXiv:1708.04552, 2017.
C. Doersch, A. Gupta, and A. A. Efros. Unsupervised visual representation learning by context prediction. In ICCV, 2015.
C. Doersch and A. Zisserman. Multi-task self-supervised visual learning. In ICCV, 2017.
A. Dosovitskiy, J. T. Springenberg, M. Riedmiller, and T. Brox. Discriminative unsupervised feature learning with convolutional neural networks. In NIPS, 2014.
F. Ebert, S. Dasari, A. X. Lee, S. Levine, and C. Finn. Robustness via retrying: Closed-loop robotic manipulation with self-supervised learning. In CoRL, 2018.
Z. Feng, C. Xu, and D. Tao. Self-supervised representation learning by rotation feature decoupling. In CVPR, 2019.
C. Finn, P. Abbeel, and S. Levine. Model-agnostic meta-learning for fast adaptation of deep networks. In Proceedings of the 34th International Conference on Machine Learning—vol. 70, pp. 1126-1135. JMLR. org, 2017.
Y. Ganin and V. Lempitsky. Unsupervised domain adaptation by backpropagation. In ICML, 2015.
V. Garcia and J. Bruna. Few-shot learning with graph neural networks. ICLR, 2017.
S. Gidaris and N. Komodakis. Dynamic few-shot visual learning without forgetting. CVPR, 2018.
S. Gidaris, P. Singh, and N. Komodakis. Unsupervised representation learning by predicting image rotations. In ICLR, 2018.
I. J. Goodfellow, J. Shlens, and C. Szegedy. Explaining and harnessing adversarial examples. ICLR, 2015.
B. Hariharan and R. Girshick. Low-shot visual recognition by shrinking and hallucinating features. In Proceedings of the IEEE International Conference on Computer Vision, pp. 3018-3027, 2017.
K. He, G. Gkioxari, P. Dollár, and R. Girshick. Mask r-cnn. In Proceedings of the IEEE international conference on computer vision, pp. 2961-2969, 2017.
K. He, X. Zhang, S. Ren, and J. Sun. Deep residual learning for image recognition. CoRR, abs/1512.03385, 2015.
K. He, X. Zhang, S. Ren, and J. Sun. Delving deep into rectifiers: Surpassing human-level performance on imagenet classification. In International conference on computer vision (ICCV), 2015.
D. Hendrycks and T. Dietterich. Benchmarking neural network robustness to common corruptions and perturbations. ICLR, 2019.
A. Hermans, L. Beyer, and B. Leibe. In defense of the triplet loss for person re-identification. arXiv preprint arXiv:1703.07737, 2017.
G. E. Hinton, N. Srivastava, A. Krizhevsky, I. Sutskever, and R. R. Salakhutdinov. Improving neural networks by preventing co-adaptation of feature detectors. arXiv:1207.0580, 2012.
Y. N. D. D. L.-P. Hongyi Zhang, Moustapha Cisse, mixup: Beyond empirical risk minimization. International Conference on Learning Representations, 2018.
Y.-C. Hsu, Z. Lv, and Z. Kira. Learning to cluster in order to transfer across domains and tasks. In ICLR, 2018.
S. Ioffe and C. Szegedy. Batch normalization: Accelerating deep network training by reducing internal covariate shift. ICML, 2015.
E. Jang, C. Devin, V. Vanhoucke, and S. Levine. Grasp2vec: Learning object representations from self-supervised grasping. In CoRL, 2018.
D. Kim, D. Cho, D. Yoo, and I. S. Kweon. Learning image representations by completing damaged jigsaw puzzles. In WACV, 2018.
A. Krizhevsky et al. Learning multiple layers of features from tiny images. Technical report, Citeseer, 2009.
A. Krizhevsky, I. Sutskever, and G. E. Hinton. Imagenet classification with deep convolutional neural networks. In NIPS, 2012.
J. Kukacka, V. Golkov, and D. Cremers. Regularization for deep learning: A taxonomy. arXiv:1710.10686, 2017.
K. Lee, S. Maji, A. Ravichandran, and S. Soatto. Meta-learning with differentiable convex optimization. CoRR, abs/1904.03758, 2019.
L. McInnes, J. Healy, and J. Melville. Umap: Uniform manifold approximation and projection for dimension reduction. arXiv preprint arXiv:1802.03426, 2018.
T. N. Mundhenk, D. Ho, and B. Y. Chen. Improvements to context based self-supervised learning. In CVPR, 2018.
A. Nichol, J. Achiam, and J. Schulman. On first-order meta-learning algorithms. arXiv preprint arXiv:1803.02999, 2018.
M. Noroozi and P. Favaro. Unsupervised learning of visual representations by solving jigsaw puzzles. In ECCV, 2016.
M. Noroozi, H. Pirsiavash, and P. Favaro. Representation learning by learning to count. In ICCV, 2017.
M. Noroozi, A. Vinjimoor, P. Favaro, and H. Pirsiavash. Boosting self-supervised learning via knowledge transfer. In CVPR, 2018.
A. v. d. Oord, Y. Li, and O. Vinyals. Representation learning with contrastive predictive coding. arXiv:1807.03748, 2018.
A. OwensandA. A. Efros. Audio-visualscene analys is with self-supervised multisensory features. ECCV, 2018.
S. J. Pan and Q. Yang. A survey on transfer learning. In Transactions on Knowledge and Data Engineering (TKDE), 2010.
D. Pathak, R. Girshick, P. Dollár, T. Darrell, and B. Hariharan. Learning features by watching objects move. In CVPR, 2017.
D. Pathak, P. Krahenbuhl, J. Donahue, T. Darrell, and A. A. Efros. Context encoders: Feature Tearning by inpainting. In CVPR, 2016.
H. Qi, M. Brown, and D. G. Lowe. Low-shot learning with imprinted weights. CVPR, 2018.
S. Ravi and H. Larochelle. Optimization as a model for few-shot learning. ICLR, 2016.
B. Recht, R. Roelofs, L. Schmidt, and V. Shankar. Do imagenet classifiers generalize to imagenet? arXiv preprint arXiv:1902.10811, 2019.
O. Russakovsky, J. Deng, H. Su, J. Krause, S. Satheesh, S. Ma, Z. Huang, A. Karpathy, A. Khosla, M. S. Bernstein, A. C. Berg, and F. Li. Imagenet large scale visual recognition challenge. CoRR, abs/1409.0575, 2014.
A. A. Rusu, D. Rao, J. Sygnowski, O. Vinyals, R. Pascanu, S. Osindero, and R. Hadsell. Meta-learning with latent embedding optimization. In International Conference on Learn-ing Representations, 2019.
N. Sayed, B. Brattoli, and B. Ommer. Cross and learn: Cross-modal self-supervision. In GCPR, 2018.
E. Schwartz, L. Karlinsky, J. Shtok, S. Harary, M. Marder, R. Feris, A. Kumar, R. Giryes, and A. M. Bronstein. Delta-encoder: an effective sample synthesis method for few-shot object recognition. NeurIPS, 2018.
P. Sermanet, C. Lynch, Y. Chebotar, J. Hsu, E. Jang, S. Schaal, and S. Levine. Time-contrastive networks: Self-supervised learning from video. arXiv preprint arXiv:1704.06888, 2017.
J. Snell, K. Swersky, and R. Zemel. Prototypical networks for few-shot learning. In Advances in Neural Information Processing Systems, pp. 4077-4087, 2017.
N. Srivastava, G. Hinton, A. Krizhevsky, I. Sutskever, and R. Salakhutdinov. Dropout: a simple way to prevent neural networks from overfitting. The journal of machine learning research, 15(1):1929-1958, 2014.
F. Sung, Y. Yang, L. Zhang, T. Xiang, P. H. Torr, and T. M. Hospedales. Learning to compare: Relation network for few-shot learning. In Proceedings of the IEEE Conference on Computer Vision and Pattern Recognition, pp. 1199-1208, 2018.
V. Verma, A. Lamb, C. Beckham, A. Najafi, I. Mitliagkas, D. Lopez-Paz, and Y. Bengio. Manifold mixup: Better representations by interpolating hidden states. In International Conference on Machine Learning, pp. 6438-6447, 2019.
O. Vinyals, C. Blundell, T. Lillicrap, D. Wierstra, et al. Matching networks for one shot learning. In Advances in neural information processing systems, pp. 3630-3638, 2016.

(56) References Cited

OTHER PUBLICATIONS

C. Wah, S. Branson, P. Welinder, P. Perona, and S. Belongie. The Caltech-UCSD Birds-200-2011 Dataset. Technical Report CNS-TR-2011-001, California Institute of Technology, 2011.

Y.-X. Wang, R. Girshick, M. Hebert, and B. Hariharan. Low-shot learning from imaginary data. In Proceedings of the IEEE Conference on Computer Vision and Pattern Recognition, pp. 7278-7286, 2018.

S. Xie, R. Girshick, P. Dollar, Z. Tu, and K. He. Aggregated residual transformations for deep neural networks. In Computer Vision and Pattern Recognition (CVPR), 2017.

S. Zagoruyko and N. Komodakis. Wide residual networks. CoRR, abs/1605.07146, 2016.

X. Zhai, A. Oliver, A. Kolesnikov, and L. Beyer. $S^4$l: Self-supervised semi-supervised learning. arXiv:1905.03670, 2019.

R. Zhang, P. Isola, and A. A. Efros. Colorful image colorization. In ECCV, 2016.

R. Zhang, P. Isola, and A. A. Efros. Split-brain autoencoders: Unsupervised learning by cross-channel prediction. In CVPR, 2017.

\* cited by examiner

| Method | mini-Imagenet | | CUB | | CIFAR-FS | |
|---|---|---|---|---|---|---|
| | 1-Shot | 5-Shot | 1-Shot | 5-Shot | 1-Shot | 5-Shot |
| MAML | 54.69 ± 0.89 | 66.62 ± 0.83 | 71.29 ± 0.95 | 80.33 ± 0.70 | 58.9 ± 1.9 | 71.5 ± 1.0 |
| ProtoNet | 54.16 ± 0.82 | 73.68 ± 0.65 | 71.88 ± 0.91 | 87.42 ± 0.48 | 55.5 ± 0.7 | 72.0 ± 0.6 |
| RelationNet | 52.19 ± 0.83 | 70.20 ± 0.66 | 68.65 ± 0.91 | 81.12 ± 0.63 | 55.0 ± 1.0 | 69.3 ± 0.8 |
| LEO | 61.76 ± 0.08 | 77.59 ± 0.12 | 68.22 ± 0.22 | 78.27 ± 0.16 | - | - |
| DCO | 62.64 ± 0.61 | 78.63 ± 0.46 | - | - | 72.0 ± 0.7 | 84.2 ± 0.5 |
| Manifold Mixup | 58.45 ± 0.63 | 76.71 ± 0.81 | 75.66 ± 0.86 | 87.00 ± 0.46 | 69.45 ± 0.37 | 83.31 ± 0.56 |
| Rotation | 64.0 ± 0.21 | 80.00 ± 0.56 | 73.11 ± 0.34 | 87.16 ± 0.77 | 70.5 ± 0.62 | 84.03 ± 0.71 |
| S2M2$_R$ | 64.99 ± 0.18 | 83.07 ± 0.13 | 81.36 ± 0.83 | 91.64 ± 0.43 | 74.45 ± 0.81 | 87.50 ± 0.54 |

Fig. 6

| Method | mini-Imagenet → CUB | |
|---|---|---|
|  | 1-Shot | 5-Shot |
| DCO | 44.79 ± 0.75 | 64.98 ± 0.68 |
| Baseline++ | 40.44 ± 0.75 | 56.64 ± 0.72 |
| Manifold Mixup | 46.21 ± 0.77 | 66.03 ± 0.71 |
| Rotation | 48.42 ± 0.84 | 68.40 ± 0.75 |
| $S2M2_R$ | 48.24 ± 0.84 | 70.44 ± 0.75 |

Fig. 7A

| Method | 10-way | | 15-way | | 20-way | |
|---|---|---|---|---|---|---|
|  | 1-shot | 5-shot | 1-shot | 5-shot | 1-shot | 5-shot |
| Baseline++ | 40.43 | 56.89 | 31.96 | 48.2 | 26.92 | 42.8 |
| LEO | 45.26 | 64.36 | 36.74 | 56.26 | 31.42 | 50.48 |
| DCO | 44.83 | 64.49 | 36.88 | 57.04 | 31.5 | 51.25 |
| Manifold Mixup | 42.46 | 62.48 | 34.32 | 54.9 | 29.24 | 48.74 |
| Rotation | 47.77 | 67.2 | 38.4 | 59.59 | 33.21 | 54.16 |
| $S2M2_R$ | 50.4 | 70.93 | 41.65 | 63.32 | 36.5 | 58.36 |

Fig. 7B

CLASSIFYING DIGITAL IMAGES IN FEW-SHOT TASKS BASED ON NEURAL NETWORKS TRAINED USING MANIFOLD MIXUP REGULARIZATION AND SELF-SUPERVISION

BACKGROUND

Deep convolutional neural networks have become a regular tool for numerous contemporary computer vision tasks. Systems have developed that can apply neural networks to tasks such as object recognition, semantic segmentation, object detection, object classification, etc. However, conventional digital image systems that utilize neural networks to classify digital images often require huge numbers of supervisory examples for training. Generally, labeled data indicating classifications for digital images is scarcely available, and data collection is often expensive. Hence, major research efforts have been dedicated to transfer learning, domain adaptation, semi-supervised training, and unsupervised training to help alleviate some of the requirements for large numbers of labeled examples.

Despite these advances however, conventional digital image systems continue to suffer from a number of disadvantages in accuracy, efficiency, and flexibility. For example, conventional digital image systems often inaccurately classify digital images, especially in circumstances where there are few labeled digital images for the given class or where a digital image belongs to an unseen or untrained class (e.g., few-shot tasks). Indeed, because many conventional systems rely on training a neural network with large numbers of labeled examples for each class to then accurately classify digital images, these systems are less capable of determining digital image classes for classes with few (or no) labeled examples.

In addition to their inaccuracy, many conventional digital image systems are also inefficient. More specifically, conventional systems often require excessive amounts of computer storage, memory, and processing power to train neural networks across large numbers of classes, where each class includes a substantial number of labeled digital images. Due to the excessive number of supervisory examples required within individual classes, conventional systems inefficiently train neural networks, especially when the number of classes becomes large.

Beyond their inaccuracy and inefficiency, conventional digital image systems are often inflexible. In particular, because many conventional systems rely on very large numbers of labeled digital images, these systems are difficult to scale. Indeed, requiring large numbers of labeled digital images prevents conventional systems from adapting to different scales of training data. For example, conventional systems cannot flexibly modify the training of neural networks to add or remove classes (or add or remove labeled examples within classes) because training these neural networks is so onerous over such large amounts of data.

Thus, there are several disadvantages with regard to conventional digital image systems.

SUMMARY

One or more embodiments described herein provide benefits and solve one or more of the foregoing or other problems in the art with systems, methods, and non-transitory computer readable media that can train a neural network to classify digital images based on manifold mixup regularization and self-supervision. In particular, the disclosed systems can utilize a few-shot learning model that improves the accuracy and efficiency of classifying digital images in the few-shot classification domain. More specifically, the disclosed systems can generate a feature manifold utilizing self-supervised training techniques and can apply manifold mixup regularization over the feature manifold. For example, the disclosed systems can utilize self-supervised training in the form of a rotation task and/or an exemplar task to generate a feature manifold that includes learned features from a set of labeled digital images. In addition, the disclosed systems can utilize manifold mixup to leverage linear interpolations in neural network layers for better generalization in few-shot tasks (e.g., classifying digital images into novel or unseen classes).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 6 illustrates a table depicting performance improvements of the digital image classification system over conventional systems in accordance with one or more embodiments;

FIGS. 7A-7B illustrate tables depicting improvements of the digital image classification system over conventional systems in accordance with one or more embodiments;

DETAILED DESCRIPTION

Figure 1:
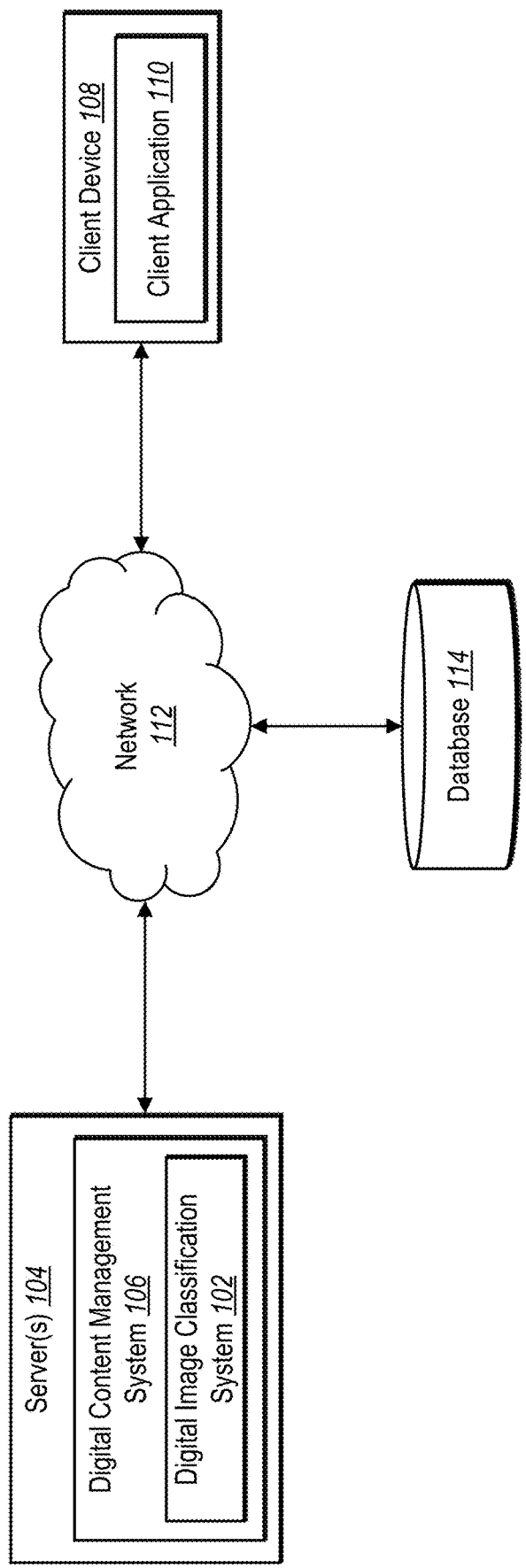
FIG. 1 illustrates an example system environment for implementing a digital image classification system in accordance with one or more embodiments.

One or more embodiments described herein provide benefits and solve one or more of the foregoing or other problems in the art with a digital image classification system that can train a neural network to classify digital images into novel classes based on manifold mixup and self-supervision. Particularly, the digital image classification system can train a base neural network based on a set of labeled digital images belonging to base classes in a fashion that promotes the neural network to classify digital images into additional classes (e.g., novel classes) not present in the base classes. In training the base neural network, the digital image classification system can generate a feature manifold based on labeled digital images by utilizing a self-supervised training technique such as rotation or exemplar training (or a combination of both). The digital image classification system can further apply manifold mixup regularization over the learned feature manifold to apply linear interpolations in deep hidden layers to improve hidden representations and decision boundaries of the base neural network. By thus utilizing self-supervision techniques augmented with manifold mixup, the digital image classification system accurately and efficiently classifies digital images in the domain of few-shot tasks.

As just mentioned, the digital image classification system can utilize few-shot learning to train a neural network to classify digital images. In few-shot learning or classification, the digital image classification system can train a base neural network on a set of base classes with abundant examples in a fashion that facilitates the neural network to classify digital images into novel classes with few (or no) labeled instances. The digital image classification system can utilize an N-way K-shot classification framework, where the digital image classification system samples N classes from a set of novel classes (classes not seen during initial training) with K examples for each class.

In some embodiments, the digital image classification system implements a few-shot classification algorithm with two separate training phases. In the first phase, the digital image classification system can train a base neural network (including a feature extractor and a first classifier) based on base classes to develop robust and general-purpose feature representations aimed to be useful for classifying digital images into novel classes. In the second phase, the digital image classification system can exploit the learning of the first phase in the form of a prior to perform classification over novel classes. For example, the digital image classification system can utilize a transfer learning approach to train a classification neural network including the feature extractor and a second classifier to classify digital images into novel classes.

As mentioned above, the digital image classification system can utilize manifold mixup regularization over a feature manifold learned via self-supervision. More particularly, the digital image classification system can modify the feature manifold generated in training the base neural network for classification into novel classes by generalizing to novel test data (e.g., unseen digital images) that is disjointed from training data (e.g., labeled digital images). For classifying digital images, the digital image classification system can apply manifold mixup regularization to leverage interpolations in deep hidden layers to improve hidden representations and decision boundaries at multiple layers.

Based on utilizing self-supervised training in addition to manifold mixup, the digital image classification system can train a classification neural network including a classifier (e.g., a cosine classifier) to accurately classify digital images into novel classes based on labeled digital images from base classes. Indeed, the digital image classification system can train a feature extractor (as part of the classification neural network) for few-shot classification tasks utilizing a self-supervised training technique of either rotation or exemplar (or both) in addition to mixing the manifold learned via the self-supervised training. Additional detail regarding the different types of self-supervised training as well as the manifold mixup regularization is provided below with reference to the figures.

The digital image classification system can provide several advantages over conventional digital image systems. For example, the digital image classification system is more accurate than conventional systems. By utilizing manifold mixup over a feature manifold generated via self-supervision, the digital image classification system can train a neural network to more accurately classify digital images in few-shot tasks (e.g., into novel classes based on training of base classes). Experimenters have demonstrated that the digital image classification system indeed improves the accuracy of digital image classification based on various digital image sets (e.g., CIFAR-FS, CUB, and mini-ImageNet) within the range of 3-8% as compared to conventional state-of-the-art systems. The digital image classification system gains improvements in accuracy versus conventional systems in few-shot classification as N increases in N-way K-shot evaluation. Additionally, the digital image classification system improves accuracy of conventional systems in cross-domain few-shot classification, where a neural network is trained with digital images of one domain and classifies digital images in another domain.

In addition to improved accuracy, the digital image classification system can also improve efficiency over many conventional digital image systems. For example, many conventional systems require large numbers of supervisory examples to effectively train a neural network to classify digital images, especially for identifying novel classes from training on base classes. By utilizing manifold mixup together with self-supervised training, the digital image classification system reduces the number of labeled examples required for training a neural network to classify digital images. With these techniques, the digital image classification system further reduces the amount of training data as compared to semi-supervised systems that require additional unlabeled data on top of labeled examples. Indeed, the digital image classification system does not require extra unlabeled digital images for training like many conventional semi-supervised systems.

The digital image classification system further improves flexibility over conventional digital image systems. For example, due to the computational expense involved in obtaining labeled data, conventional systems are difficult to scale for consumption in deep learning models. The digital image classification system, on the other hand, can flexibly scale for various deep learning models (e.g., neural networks) based on utilizing smaller amounts of labeled data to classify digital images into novel classes. For example, the digital image classification system can readily modify a neural network to adapt to different classes because the digital image classification system requires such smaller amounts of labeled digital images. In addition, the digital image classification system can flexibly adapt to classify digital images within different domains based. Indeed, based on training a classification neural network within a first domain, the digital image classification system can more accurately classify digital images in a different domain.

As illustrated by the foregoing discussion, the present disclosure utilizes a variety of terms to describe features and benefits of the digital image classification system. Additional detail is hereafter provided regarding the meaning of these terms as used in this disclosure. In particular, the term "label" (or "labeled") refers to an assigned designation of a class for a digital image that is based on whatever is depicted within the digital image. For example, a label can include an identification of one or more objects, people, or scenes depicted or portrayed within a digital image. In some embodiments, a label can include a single word or string such as "person," "tree," "car," or "dog." In certain embodiments, a label can be more specific to describe or designate depicted objects on a more granular level such as "teenage boy," "elm tree," "sedan," or "bulldog."

Relatedly, the term "class" refers to a classification or categorization of a digital image. In particular, a class can correspond to a label, where the label indicates (or belongs within) the class associated with a digital image. For example, a class can correspond to a type of object, person, or scene depicted within a digital image. A class can include a numerical representation of one or more digital image labels such as a one-hot encoding having a particular number of digits corresponding to the total number of classes. In some embodiments, a class can include (or correspond to) a string of text where, for example, the class of "tree" includes digital images of all types of trees. In other embodiments, classes can be narrower, where individual classes can include digital images of particular types of trees such as "elm tree," "fir tree," or "maple tree." As used herein, the term "base class" refers to a known class associated with labeled digital images utilized to train a neural network. For example, the digital image classification system can train a neural network to classify digital images based on labeled digital images corresponding to a plurality of base classes. The term "novel class," on the other hand, refers to a class that has few (or no) labeled examples. For instance, a novel class can include a class that is unseen or unknown for a neural network. As mentioned, the digital image classification system can utilize a neural network trained on base classes to classify digital images into novel classes.

As also mentioned, the digital image classification system can train a neural network to classify digital images. As used herein, the term "neural network" refers to a machine learning model that can be trained and/or tuned based on inputs to determine classifications or approximate unknown functions. In particular, the term neural network can include a model of interconnected artificial neurons (e.g., organized in layers) that communicate and learn to approximate complex functions and generate outputs (e.g., determinations of digital image classes) based on a plurality of inputs provided to the neural network. In addition, a neural network can refer to an algorithm (or set of algorithms) that implements deep learning techniques to model high-level abstractions in data. To illustrate, a neural network can include a base neural network (e.g., deep convolutional neural network) that includes constituent components (made up of one or more layers) such as a feature extractor and a classifier.

Relatedly, the term "feature extractor" refers to one or more layers of a neural network that extract features relating to digital images. For example, a feature extractor can include a particular number of layers (e.g., 4 layers) including one or more fully connected and/or partially connected layers of neurons that identify and represent visible and/or unobservable characteristics of a digital image. As used herein, the term "feature" (as extracted by a feature extractor) refers to characteristics or attributes of a digital image. In some embodiments, features can include observable characteristics of a digital image. Additionally (or alternatively), features can include latent features and/or unobservable deep features generated or extracted by a feature extractor.

In addition, the term "classifier" refers to one or more layers of a neural network that determine classes for digital images based on features of the digital images. For example, a classifier can include one or more fully connected layers and/or SoftMax layers that determine classes to which digital images belong based on features associated with the digital images. In some embodiments, a classifier can include, as part of a base neural network, a first classifier (e.g., a linear classifier) that determines classes (from among a plurality of base classes) for labeled digital images as part of a training process. In the same or other embodiments, a classifier can include a second classifier such as a cosine classifier to classify digital images into additional (novel) classes not included in the base classes.

As mentioned, the digital image classification system can train a neural network to classify digital images. As used herein, the term "train" (or "trained" or "training") refers to utilizing information to tune or teach a neural network by, for example, adjusting one or more weights or parameters of the neural network such as parameters of a feature extractor and/or a classifier. In some embodiments, the digital image classification system trains a neural network utilizing multiple training processes, stages, or steps. For example, in a first training stage, the digital image classification system can train a base neural network including a feature extractor and a first classifier together based on labeled digital images corresponding to a plurality of base classes. In a second training stage, based on learning features in the first training, the digital image classification system can train or tune a classification neural network including the feature extractor and a second classifier to classify digital images into additional classes not present within the plurality of base classes.

Indeed, the digital image classification system can generate a feature manifold utilizing the feature extractor. As used herein, the term "feature manifold" refers to a representation or a collection of features learned by a neural network or a feature extractor. For example, a feature manifold can include a collection of digital image features that a feature extractor learns as part of a training process. In some embodiments, a feature manifold can have different shapes and/or dimensions and can reflect relationships between digital image features and corresponding (base) classes. Indeed, the digital image classification system can generate a feature manifold as part of training a feature extractor and a first classifier to correctly classify labeled digital images into base classes.

As mentioned above, the digital image classification system can utilize self-supervision to train a base neural network including a feature extractor and a classifier. As used herein, the term "self-supervision" (or "self-supervised training" or "self-supervised learning") refers to a learning or training process for a neural network where training data is automatically and/or autonomously labeled (or where labels are automatically inferred). In particular, self-supervised training can train a neural network to learn semantically meaningful features using the inherent structure of the available data. Self-supervised training can include predicting types of modification applied to digital images to enforce invariant (or less variant) feature representation with respect to digital image augmentations. For example, self-supervised training can include one or more particular training techniques or methods such as rotation training and/or exemplar training. Additional detail regarding the different types of self-supervised training (e.g., rotation and exemplar) is provided below with reference to the figures.

As also mentioned, the digital image classification system can utilize manifold mixup regularization to mix or modify a feature manifold learned via self-supervised training and improve hidden feature representations and decision boundaries between neural network layers. As used herein, the term "manifold mixup regularization" (or "manifold mixup") refers to a process or method of mixing features of a neural network for better generalization. More specifically, manifold mixup can include modifying a feature manifold (e.g., utilizing a mixing coefficient) to better generalize predictions of digital image classes. In some embodiments, manifold mixup results in lower-confidence predictions between different classes but also results in smoother decision boundaries with broad regions for identifying individual classes. In addition, manifold mixup can include utilizing a regularizer to flatten hidden representations to represent digital images in lower dimensions. In one or more embodiments, manifold mixup regularization involves mixing features of digital images at each layer of a neural network (e.g., layers of a feature extractor) utilizing linear combinations.

Additional detail regarding the digital image classification system will now be provided with reference to the figures. For example, FIG. 1 illustrates a schematic diagram of an example system environment for implementing a digital image classification system 102 in accordance with one or more embodiments. An overview of the digital image classification system 102 is described in relation to FIG. 1. Thereafter, a more detailed description of the components and processes of the digital image classification system 102 is provided in relation to the subsequent figures.

As shown, the environment includes server(s) 104, a client device 108, a network 112, and a database 114. Each of the components of the environment can communicate via the network 112, and the network 112 may be any suitable network over which computing devices can communicate. Example networks are discussed in more detail below in relation to FIG. 10.

As mentioned, the environment includes a client device 108. The client device 108 can be one of a variety of computing devices, including a smartphone, a tablet, a smart television, a desktop computer, a laptop computer, a virtual reality device, an augmented reality device, or another computing device as described in relation to FIG. 10. Although FIG. 1 illustrates a single client device 108, in some embodiments the environment can include multiple different client devices, each associated with a different user. The client device 108 can communicate with the server(s) 104 via the network 112. For example, the client device 108 can receive user input from a user interacting with the client device 108 (e.g., via the client application 110) to request classification of a digital image. Thus, the digital image classification system 102 on the server(s) 104 can receive information or instructions to determine a class associated with the digital image by utilizing a trained base neural network and a trained classification neural network.

As shown, the client device 108 includes a client application 110. In particular, the client application 110 may be a web application, a native application installed on the client device 108 (e.g., a mobile application, a desktop application, etc.), or a cloud-based application where all or part of the functionality is performed by the server(s) 104. The client application 110 can present or display information to a user, including one or more digital images and/or user interface elements (e.g., editing tools) to edit or otherwise interact with a digital image(s). A user can interact with the client application 110 to provide user input to, for example, request a classification for a digital image.

As illustrated in FIG. 1, the environment includes the server(s) 104. The server(s) 104 may generate, track, store, process, receive, and transmit electronic data, such as digital images or digital image classes. For example, the server(s) 104 may receive data from the client device 108 in the form of a request to classify a digital image. In addition, the server(s) 104 can transmit data to the client device 108 to provide a classification associated with the digital image. Indeed, the server(s) 104 can communicate with the client device 108 to transmit and/or receive data via the network 112. In some embodiments, the server(s) 104 comprises a distributed server where the server(s) 104 includes a number of server devices distributed across the network 112 and located in different physical locations. The server(s) 104 can comprise a content server, an application server, a communication server, a web-hosting server, or a digital content management server.

As shown in FIG. 1, the server(s) 104 can also include the digital image classification system 102 as part of a digital content management system 106. The digital content management system 106 can communicate with the client device 108 to generate, modify, and transmit digital content, such as digital images as well as digital image classes. In addition, the digital content management system 106 and/or the digital image classification system 102 can communicate with the database 114 to access and/or store information such as digital images (e.g., labeled digital images and novel class digital images) and corresponding digital image classes. Thus, the digital image classification system 102 can train one or more neural networks such as a base neural network and a classification neural network to classify digital images in few-shot tasks.

Although FIG. 1 depicts the digital image classification system 102 located on the server(s) 104, in some embodiments, the digital image classification system 102 may be implemented by (e.g., located entirely or in part) on one or more other components of the environment. For example, the digital image classification system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the digital image classification system 102, bypassing the network 112. Additionally, the digital image classification system 102 can include one or more neural networks (e.g., a base neural network and a classification neural network) included within the database 114, included as part of the client application 110, or housed on the server(s) 104.

As mentioned, the digital image classification system 102 can utilize a trained classification neural network to identify a novel class associated with a digital image (e.g., in a few-shot classification task). More specifically, the digital image classification system 102 can apply a feature extractor of a classification neural network to extract features associated with a digital image based on training the feature extractor over a set of labeled digital images corresponding to a plurality of base classes. The digital image classification system 102 can further apply a classifier (e.g., a cosine classifier) to process the extracted features to classify the digital image into one or more additional classes not present in the plurality of base classes. Indeed, FIG. 2 illustrates determining a digital image class 216 for a digital image 204 by applying a trained classification neural network 206 in accordance with one or more embodiments.

Figure 2:
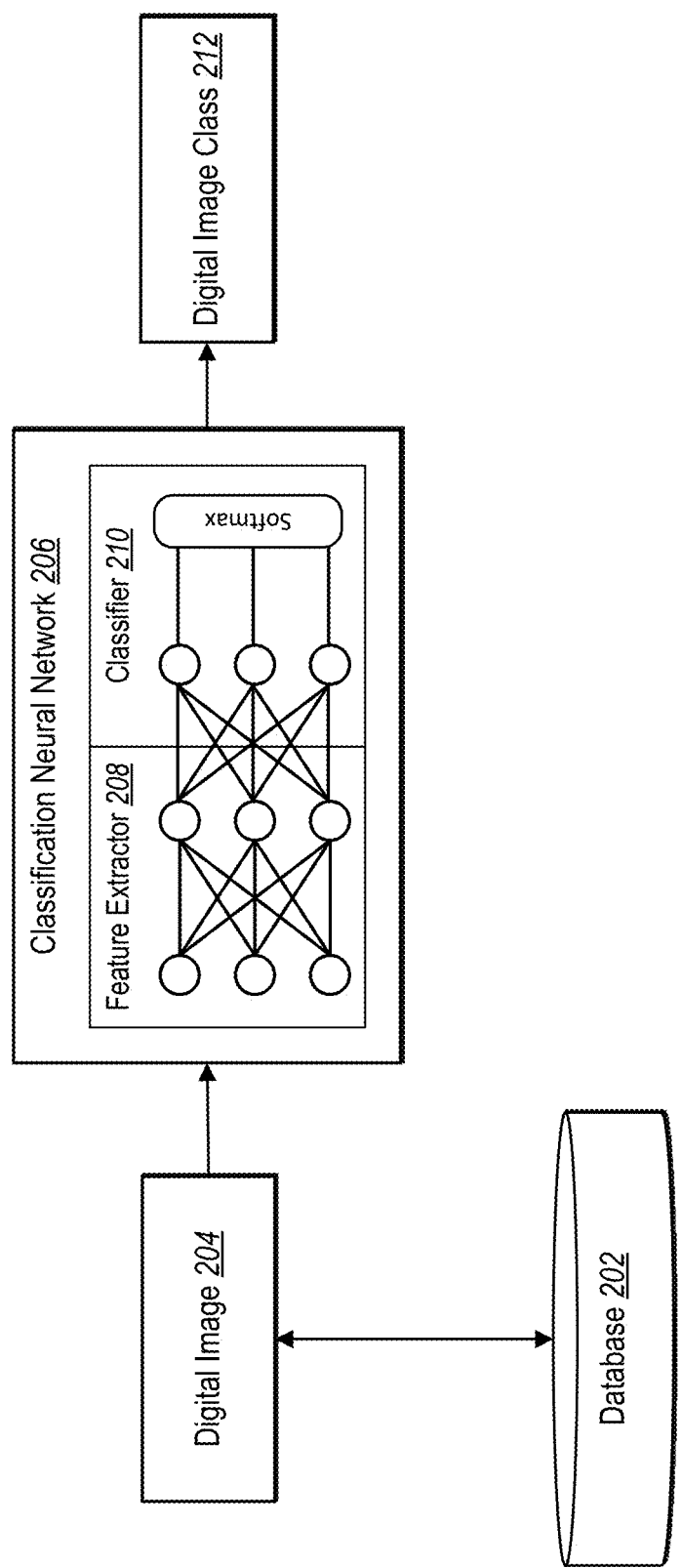
FIG. 2 illustrates an overview of a trained classification neural network determining a digital image class for a digital image in accordance with one or more embodiments.

As shown in FIG. 2, the digital image classification system 102 accesses a digital image 204 from a database 202 (e.g., the database 114) to input into the classification neural network 206. In some embodiments, the digital image classification system 102 identifies the digital image 204 selected by way of or received from the client device 108. In any case, the digital image classification system 102 inputs the digital image 204 into the classification neural network 206 to determine the digital image class 212.

More particularly, the digital image classification system 102 utilizes the feature extractor 208 of the classification neural network 206 to extract features associated with the digital image 204. To extract features from the digital image 204, the digital image classification system 102 applies the feature extractor 208 trained as part of a base neural network to classify digital images based on manifold mixup regularization over a feature manifold generated via self-supervised training over a set of labeled digital images corresponding to a plurality of base classes. Thus, the digital image classification system 102 applies the trained feature extractor 208 to extract features from the digital image 204. In one or more embodiments, the feature extractor 208 extracts latent or deep features from the digital image 204 learnt during training to aid in determining a classification of digital images.

As illustrated in FIG. 2, the digital image classification system 102 further applies a classifier 210 associated with the classification neural network 206 to determine the digital image class 212. In particular, the digital image classification system 102 determines a classification (i.e., the digital image class 212) for the digital image by processing the extracted features using the classifier 210. Indeed, as described in further detail below, the digital image classification system 102 trains the classifier 210 for few-shot tasks to classify digital images into one or more additional (e.g., novel) classes not present in the plurality of base classes. Thus, by applying the trained feature extractor 208 and the trained classifier 210 as part of the classification neural network 206, the digital image classification system 102 determines the digital images class 212 for the digital image 204. By way of example, based on training the feature extractor 208 and the classifier 210 in relation to base classes such as "dog," "cat," "person," and "bear," the digital image classification system 102 can analyze the digital image 204 to determine that the digital image 204 depicts a tiger to classify the digital image within a novel "tiger" class.

As mentioned, to classify a digital image into a novel class, the digital image classification system 102 can initially train a base neural network to classify digital images into base classes. More specifically, the digital image classification system 102 can train a base neural network including a feature extractor and a first classifier (e.g., a linear classifier) to classify digital images into base classes based on a set of labeled digital images belonging to the base classes. Indeed, FIG. 3 illustrates training the base neural network 304 utilizing a set of labeled digital images 302 corresponding to a plurality of base classes in accordance with one or more embodiments.

Figure 3:
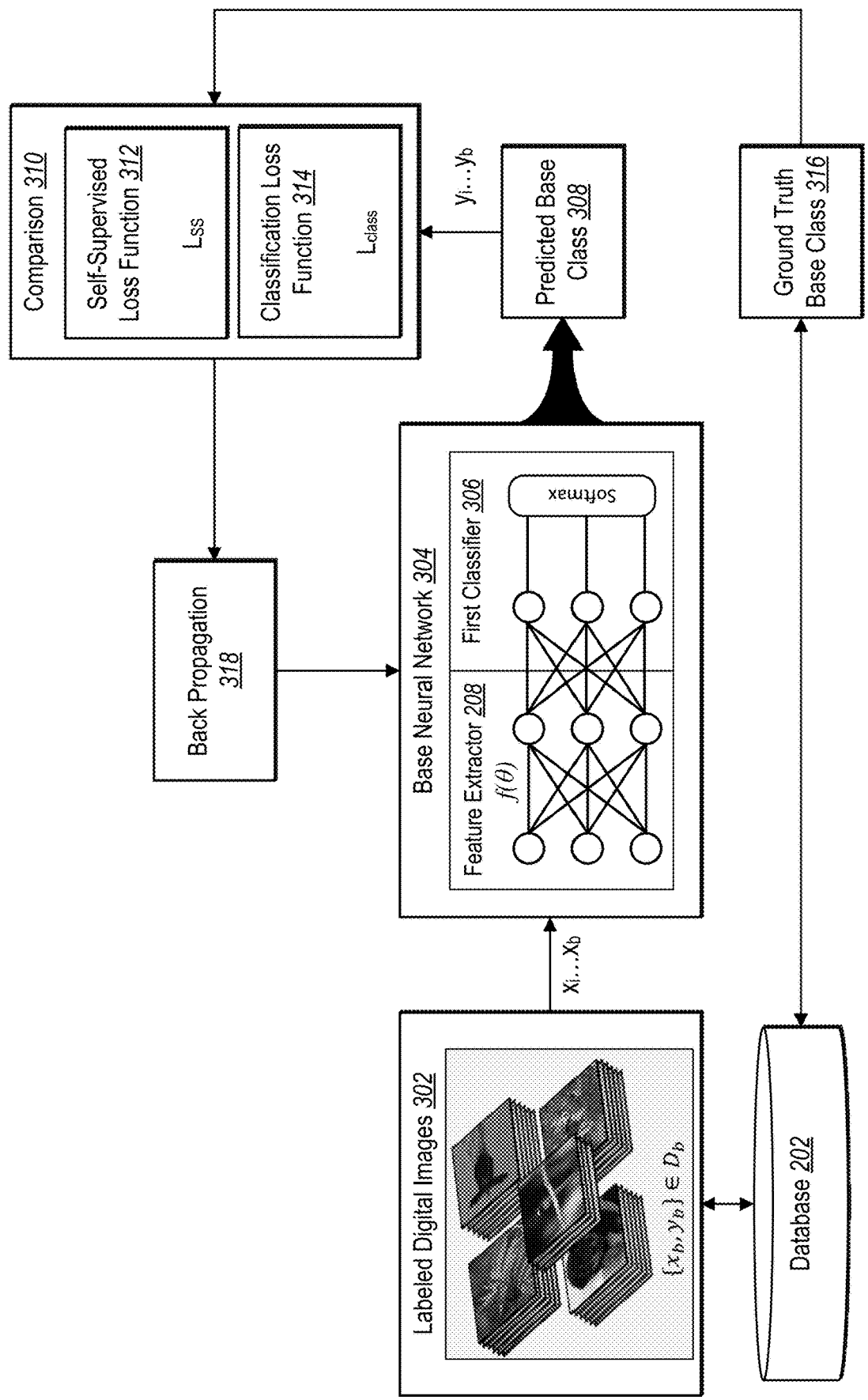
FIG. 3 illustrates an overview of training a base neural network using self-supervision in accordance with one or more embodiments.

As shown in FIG. 3, the digital image classification system 102 accesses a set of labeled digital images 302 from the database 202. In particular, the digital image classification system 102 identifies the labeled digital images 302 as digital images that belong to particular base classes (as indicated by the separate stacks of the labeled digital images 302). Indeed, the few-shot learning setting is formalized by the availability of a dataset with image-label pairs $\mathcal{D} = \{(x_i, y_i): i=1, \ldots, m\}$ where $x \in \mathbb{R}^d$ and $y \in C$, $C$ being the set of all classes (base classes and novel classes).

From the image-label pairs $\mathcal{D}$, the digital image classification system 102 accesses base class data $\mathcal{D}_b = \{(x_i, y_i): i=1, \ldots, m_b\}$ where $\{y_i \in C_b \subset C\}$ to utilize in training the base neural network 304. Thus, there are $x_b$ total digital images within the set of labeled digital images 302 corresponding to a total of $y_b$ labels. The digital image classification system 102 further inputs a labeled digital image $x_i$ (from among the set of labeled digital images 302 including the $x_b$ total labeled digital images) into the base neural network 304.

Based on the input labeled digital image $x_i$, the base neural network 304 generates a predicted base class 308 (e.g., as indicated by the label $y_i$ for the input labeled digital image $x_i$). In particular, the base neural network 304 determines a predicted base class 308 to which the input labeled digital image $x_i$ belongs. To determine the predicted base class 308, the digital image classification system 102 utilizes the feature extractor 208 and the first classifier 306 of the base neural network 304. Indeed, the base neural network 304 can include multiple layers, some of which comprise the feature extractor 208 and others of which comprise the first classifier 306. For example, the base neural network 304 can include an $N_b$-way neural network classifier:

$$g = c_{W_b} \circ f_\theta$$

where $c_{W_b}$ is a cosine classifier (the first classifier 306), $f_\theta$ is a convolutional feature extractor (the feature extractor 208), and $N_b$ is the number of base classes corresponding to the labeled digital images 302.

By utilizing the feature extractor 208, the digital image classification system 102 extracts features from the input labeled digital image $x_i$. Based on the extracted features, the digital image classification system 102 applies the first classifier 306 to determine the predicted base class 308 corresponding to the input labeled digital image $x_i$ (or to the extracted features). As shown in FIG. 3, the first classifier 306 includes one or more fully connected layers and a SoftMax layer for determining the predicted base class 308 from the features within the feature extractor 208. While FIG. 3 illustrates a particular number of layers and neurons within the feature extractor 208 and the first classifier 306, this is merely exemplary for discussion purposes, and additional/alternative configurations are possible.

In addition to determining the predicted base class 308, the digital image classification system 102 further performs a comparison 310 to compare the predicted base class 308 with a ground truth base class 316. In particular, the digital image classification system 102 performs the comparison 310 to determine an error or measure of loss associated with the base neural network 304 and/or its constituent components, the feature extractor 208 and the first classifier 306. For instance, the digital image classification system 102 evaluates the base neural network 304 by accessing, from the database 202, a ground truth base class 316 that corresponds to (e.g., is the actual base class for) the input labeled digital image $x_i$. The digital image classification system 102 further compares the ground truth base class 316 with the predicted base class 308 by utilizing one or more loss functions such as a self-supervised loss function 312 and a classification loss function 314.

For example, the digital image classification system 102 determines a self-supervised loss $L_{SS}$ associated with the base neural network 304 by utilizing the self-supervised loss function 312 as part of a self-supervised training process. In some embodiments, the self-supervised training process includes one or more of a rotation training process or an exemplar training process. In embodiments where the self-supervised training process includes a rotation training process, the digital image classification system 102 rotates the input labeled digital image $x_i$ and predicts an amount of rotation applied to the input labeled digital image $x_i$ via the base neural network 304.

To elaborate, in one or more embodiments, the self-supervised loss function 312 includes a rotation loss function as part of a rotation training process. The rotation loss function can be represented as follows:

$$L_{rot} = \frac{1}{|C_R|} * \sum_{x \in \mathcal{D}_b} \sum_{r \in C_R} L(c_{W_r}(f_\theta(x^r)), r)$$

where L represents cross-entropy loss, $|C_R|$ represents the cardinality of $C_R$, $c_{W_r}$ is a 4-way linear classifier, $f_\theta(x^r)$ is the penultimate representation of the input labeled digital image $x_i$ rotated by r degrees, and $r \in C_R = \{0°, 90°, 180°, 270°\}$. Thus, the digital image classification system 102 utilizes the base neural network 304 and the self-supervised loss function 312 to predict which of the 4 classes (i.e., which of the 4 rotation amounts 0°, 90°, 180°, 270°) applies to the input labeled digital image $x_i$. In one or more embodiments, the digital image classification system 102 utilizes a rotation loss function with additional and/or alternative rotation amounts, where increasing the number of rotation amounts also increases the cardinality of $C_R$. In one or more embodiments, the digital image classification system 102 utilizes the rotation training process described by S. Gidaris, P. Singh, and N. Komodakis in *Unsupervised Representation Learning by Predicting Image Rotations*, ICLR (2018), which is incorporated by reference herein in its entirety.

In some embodiments, the self-supervised training process includes an exemplar training process that involves applying an exemplar loss function. For instance, in applying an exemplar loss function, the digital image classification system 102 modifies the input labeled digital image $x_i$ utilizing a random augmentation from a set of augmentations and utilizes the base neural network 304 to predict which augmentation was applied. As an example, the digital image classification system 102 randomly selects an augmentation from a set including translation, scaling, rotation, contrast shift, and color shift to apply to the input labeled digital image $x_i$. Thus, in utilizing exemplar training, the digital image classification system 102 aims at making the feature representations of digital images invariant (or less variant) to a wide range of image augmentations or transformations.

For example, in a given mini-batch M of labeled digital images 302, the digital image classification system 102 creates multiple (e.g., 2, 4, or 8) copies of the input labeled digital image $x_i$ by applying different random augmentations to each copy. In various embodiments, the digital image classification system 102 can utilize more or fewer augmentations and therefore create more or fewer copies of the input labeled digital image x . In any event, the digital image classification system 102 treats the copies as positive examples and treats every other image in the mini-batch M as a negative example. The digital image classification system 102 further utilizes hard batch triplets with soft margins on $f_\theta(x)$ on the mini-batch M to bring the feature representation of positive examples closer together.

In one or more embodiments, the self-supervised loss function 312 can include an exemplar loss function for determining an exemplar loss, as given by:

$$L_e = \frac{1}{4*|M|} \sum_{x \in M} \sum_{k=1}^{4} \log\left(1 + \exp\left(-\max_{p \in \{1,\ldots,4\}} D(x_k^i, x_p^i) + \min_{p \in \{1,\ldots,4\} | i \neq j} D(x_k^i, x_p^j)\right)\right)$$

where D represents a Euclidean distance in the feature representation space $f_\theta(x)$ and $x_k^i$ is the $k^{th}$ exemplar of x with class label i (e.g., the corresponding augmentation). The first term ("max") inside the exp term is the maximum among distances between a digital image and its positive examples that the digital image classification system 102 aims to reduce. The second term ("min") is the minimum distance between the digital image and its negative examples which the digital image classification system 102 aims to maximize. In some embodiments, the digital image classification system 102 utilizes the exemplar training process described by A. Dosovitskiy, J. T. Springenberg, M. Riedmiller, and T. Brox in *Discriminative Unsupervised Feature Learning with Convolutional Neural Networks*, NIPS (2014), which is incorporated by reference herein in its entirety.

As mentioned above, in addition to determining a self-supervised loss, the digital image classification system 102 can determine a classification loss associated with the base neural network 304. For example, the digital image classification system 102 can determine a classification loss $L_{class}$ such as a cross-entropy loss associated with the base neural network 304. Indeed, the digital image classification system 102 determines a classification loss $L(.|w_b)$ based on the labeled digital images 302 corresponding to the plurality of base classes.

In addition to determining a classification loss and a self-supervised loss, the digital image classification system 102 can determine a composite loss. For example, in some embodiments, the digital image classification system 102 determines a composite loss by combining one or more of the self-supervised losses (e.g., the rotation loss and/or the exemplar loss) with the classification loss. Indeed, the digital image classification system 102 determines a composite loss $L_{comp}$, as given by:

$$L_{comp} = L_{class} + L_{SS}$$

where $L_{SS} \in \{L_e, L_{rot}\}$.

As illustrated in FIG. 3, the digital image classification system 102 further performs a back propagation 318. More specifically, based on the comparison 310 (e.g., based on the self-supervised loss $L_{SS}$ and/or the classification loss $L_{class}$), the digital image classification system 102 further performs a back propagation 318 to modify weights and/or parameters associated with the base neural network 304. For instance, the digital image classification system 102 back propagates to adjust parameters in relation to particular layers or neurons within the feature extractor 208 as well as the first classifier 306 to modify the way the base neural network 304 analyzes digital images in generating predicted classes. Indeed, the digital image classification system 102 performs the back propagation 318 to minimize or reduce one or more of the composite loss, the self-supervised loss, or the classification loss for subsequent iterations of training the base neural network 304.

Thus, to continue training the base neural network 304 to accurately determine predicted base classes for the labeled digital images 302, the digital image classification system 102 selects additional labeled digital images to input into the base neural network 304. Indeed, the digital image classification system 102 repeats the methods described above in relation to FIG. 3 for different labeled digital images $x_i, \ldots, x_n$ corresponding to labels $y_i, \ldots, y_n$. For each iteration corresponding to a different labeled digital image, the digital image classification system 102 utilizes the base neural network 304 to predict a base class, compares the predicted base class with a ground truth base class using the above-described loss functions, and back-propagates to iteratively improve the accuracy of the base neural network 304 by modifying various parameters. In some embodiments, the digital image classification system 102 performs many iterations or epochs of training over the labeled digital images 302 until the base neural network 304 classifies the labeled digital images with at least a threshold accuracy (or until the self-supervised loss and/or the classification loss are below a threshold loss). Thus, the digital image classification system 102 trains the base neural network 304 to accurately classify the labeled digital images 302 into the corresponding base classes.

Based on training the base neural network 304, the digital image classification system 102 can generate a feature manifold. In particular, the digital image classification system 102 generates a feature manifold that includes or represents features learned by the feature extractor 208 corresponding to the labeled digital images 302. For example, throughout the process of training the base neural network 304, the feature extractor 208 generates feature manifolds corresponding to input labeled digital images (in accordance various adjustments to weights/parameters of the base neural network 304). Thus, upon training the base neural network 304 to accurately classify the labeled digital images 302, the digital image classification system 102 accesses the feature manifold of the feature extractor 208 that represents the learned features whereby the base neural network 304 accurately classifies the labeled digital images 302 into corresponding base classes.

As mentioned, the digital image classification system 102 can further train the base neural network 304 based on manifold mixup regularization. More specifically, the digital image classification system 102 can modify a feature manifold generated by the base neural network 304 by applying a mixing coefficient to generalize predictions of digital image classes. Indeed, by utilizing manifold mixup regularization, the digital image classification system 102 leverages interpolations in deep hidden layers of the base neural network 304 to improve hidden representations and decision boundaries. Applying manifold mixup to the feature manifold learned via the above-described self-supervision enables the digital image classification system 102 to significantly outperform other conventional digital image systems.

Indeed, few-shot learning relies on robust and generalizable features that enable the digital image classification system 102 to separate base classes from novel classes. An important means to this end is the ability to compartmentalize the representations of base classes with generous decision boundaries which allows the digital image classification system 102 to generalize to novel classes more accurately. Thus, by utilizing manifold mixup regularization in addition to the above-described self-supervision, the digital image classification system 102 learns a base neural network 304 that can generate a feature manifold with sufficient decision boundaries between classes to extend to novel classes.

Figure 4:
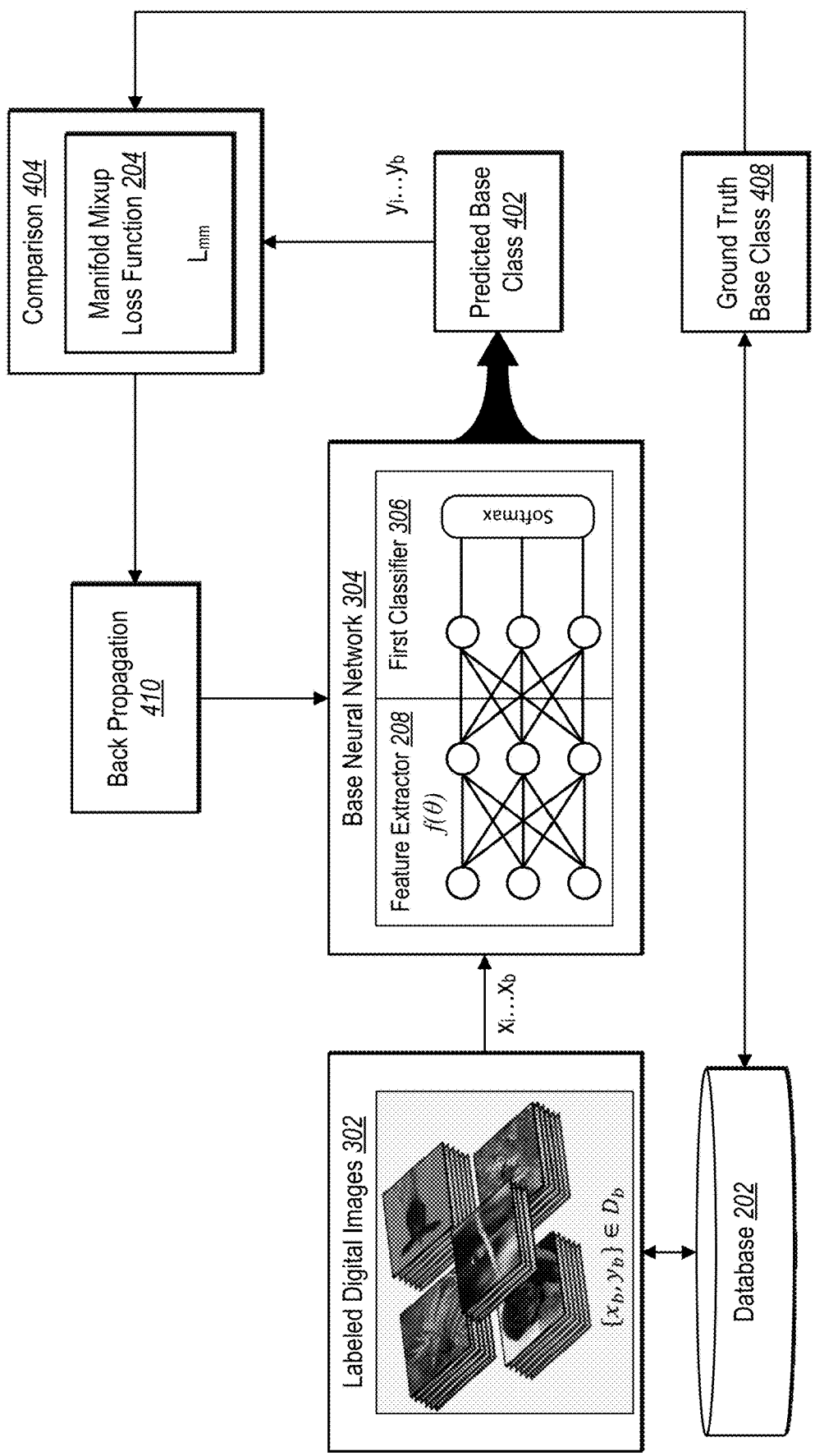
FIG. 4 illustrates an overview of training a base neural network using manifold mixup regularization in accordance with one or more embodiments.

FIG. 4 illustrates training the base neural network 304 utilizing manifold mixup regularization in accordance with one or more embodiments. As shown in FIG. 4, the digital image classification system 102 trains the base neural network 304 (over a few more epochs on top of those involved in the training described above in relation to FIG. 3) based on the labeled digital images 302, applying a manifold mixup loss function 406. The digital image classification system 102 accesses a labeled digital image (e.g., the labeled digital image $x_i$) from the database 202 to input into the base neural network 304. In addition, the digital image classification system 102 applies the base neural network 304 to analyze the labeled digital image to determine a predicted base class 402 for the labeled digital image. For example, the digital image classification system 102 applies the feature extractor 208 and the first classifier 306 to classify the labeled digital image in accordance with the learned feature manifold of the feature extractor 208 (e.g., as learned via the training described in relation to FIG. 3).

Further, the digital image classification system 102 performs a comparison 404 to compare the predicted base class 402 with a ground truth base class 408. Indeed, the digital image classification system 102 accesses the ground truth base class 408 from the database 202 by identifying a base class that corresponds to the labeled digital image that was input into the base neural network 304. Additionally, the digital image classification system 102 performs the comparison 404 by utilizing a manifold mixup loss function 406 to determine a manifold mixup loss $L_{mm}$. For example, the digital image classification system 102 mixes the learned feature manifold using a mixing coefficient to predict less confidently on linear interpolations of hidden representations and to develop broad regions of low-confidence predictions between different classes and thereby develop smoother decision boundaries.

To elaborate, given input digital images x and x' with corresponding feature representations at layer 1 given by $f_\theta^l(x)$ and $f_\theta^l(x')$, the digital image classification system 102 utilizes a manifold mixup regularizer, as represented by the manifold mixup loss function:

$$L_{mm} = \mathbb{E}_{(x,y) \in \mathcal{D}_b}[L(Mix_\lambda(f_\theta^l(x), f_\theta^l(x')), Mix_\lambda(y, y'))]$$

where $$Mix_\lambda(a, b) = \lambda \cdot a + (1-\lambda) \cdot b$$

and where the mixing coefficient $\lambda$ is sampled from a $\beta(a, a)$ distribution and L is the cross-entropy loss.

By applying the above manifold mixup regularizer, the digital image classification system 102 generates robust, flattened hidden representations for each class with fewer numbers of directions of high variance—i.e., the feature representations of digital images from each base class lie in a lower-dimensional subspace. In some embodiments, the digital image classification system 102 utilizes the manifold mixup regularization process described by V. Verma, A. Lamb, C. Beckham, A. Najafi, I. Mitliagkas, D. Lopez-Paz, and Y. Bengio in *Manifold Mixup: Better Representations by Interpolating Hidden States*, Int'l Conference on Machine Learning 6438-47 (2019), which is incorporated by reference herein in its entirety.

As shown in FIG. 4, in addition to performing the comparison 404, the digital image classification system 102 further performs a back propagation 410. In particular, the digital image classification system 102 modifies parameters associated with the base neural network 304 to reduce the manifold mixup loss $L_{mm}$. The digital image classification system 102 further repeats the training process illustrated in FIG. 4 by selecting labeled digital images, inputting the images into the base neural network 304, determining predicted base classes, comparing the predictions with ground truth base classes, and back propagating to modify parameters and reduce the loss associated with the comparison. In some embodiments, the digital image classification system 102 performs several iterations or epochs of training over the labeled digital images 302 until the base neural network 304 classifies the labeled digital images with at least a threshold accuracy (or until the manifold mixup loss is below a threshold loss).

In one or more embodiments, the digital image classification system 102 trains the base neural network 304 using self-supervision and manifold mixup in accordance with the below pseudo-code. Indeed, the following algorithm (in addition to the description of FIGS. 3-4) can provide the necessary structure and/or algorithms for a step for training a base neural network comprising a feature extractor and a first classifier to classify digital images into the plurality of base classes based on self-supervision and manifold mixup regularization in relation to the set of labeled digital images.

```
Algorithm 1 S2M2 feature backbone training begin
 |    Input: {x, y} ∈ 𝒟_b; α; {x', y'} ∈ 𝒟_val
 |    Output: Backbone model f_θ
 |    ▷ Feature extractor backbone f_θ training
 |    Initialize f_θ
 |    for epochs ∈ {1, 2, ..., 400} do
 |    |    Training data of size B – (X(i), Y(i)).
 |    |    L(θ, X(i), Y(i)) = L_class + L_ss
 |    |    θ → θ – η * ∇L(θ, X(i), Y(i))
 |    end
 |    val_acc_prev = 0.0
 |    val_acc_list = [ ]
 |    ▷ Fine-tuning f_θ with Manifold Mixup
 |    while val_acc > val_acc_prev do
 |    |    Training data of size B – (X(i), Y(i)).
 |    |    L(θ, X(i), Y(i)) = L_mm + 0.5(L_class + L_ss)
 |    |    θ → θ – η * ∇L(θ, X(i), Y(i))
 |    |    val_acc = Accuracy_{x,y ∈ 𝒟_val} (W_n(f_θ(x)), y)
 |    |    Append val_acc to val_acc_list
 |    |    Update val_acc_prev with val_acc
 |    end
 |    return fine-tuned backbone f_θ.
end
```

As shown by the above algorithm, in a first step the digital image classification system 102 can train the base neural network (which includes the feature extractor $f_\theta$) for an initial set of epochs (e.g., 400) using self-supervision as an auxiliary loss along with a classification loss ($L_{class}+L_{SS}$, where $L_{SS} \in \{L_e, L_{rot}\}$).

In a second step, the digital image classification system 102 can fine tune the base neural network for another set of epochs using a manifold mixup loss $L_{mm}$. As shown, in one or more embodiments during the second fine tuning step, the digital image classification system 102 can weigh the manifold mixup loss more than the classification and self-supervision losses. In particular, as shown by Algorithm 1, the digital image classification system 102 can apply 0.5 weight to the classification and self-supervision losses during the fine-tuning step.

Figure 5:
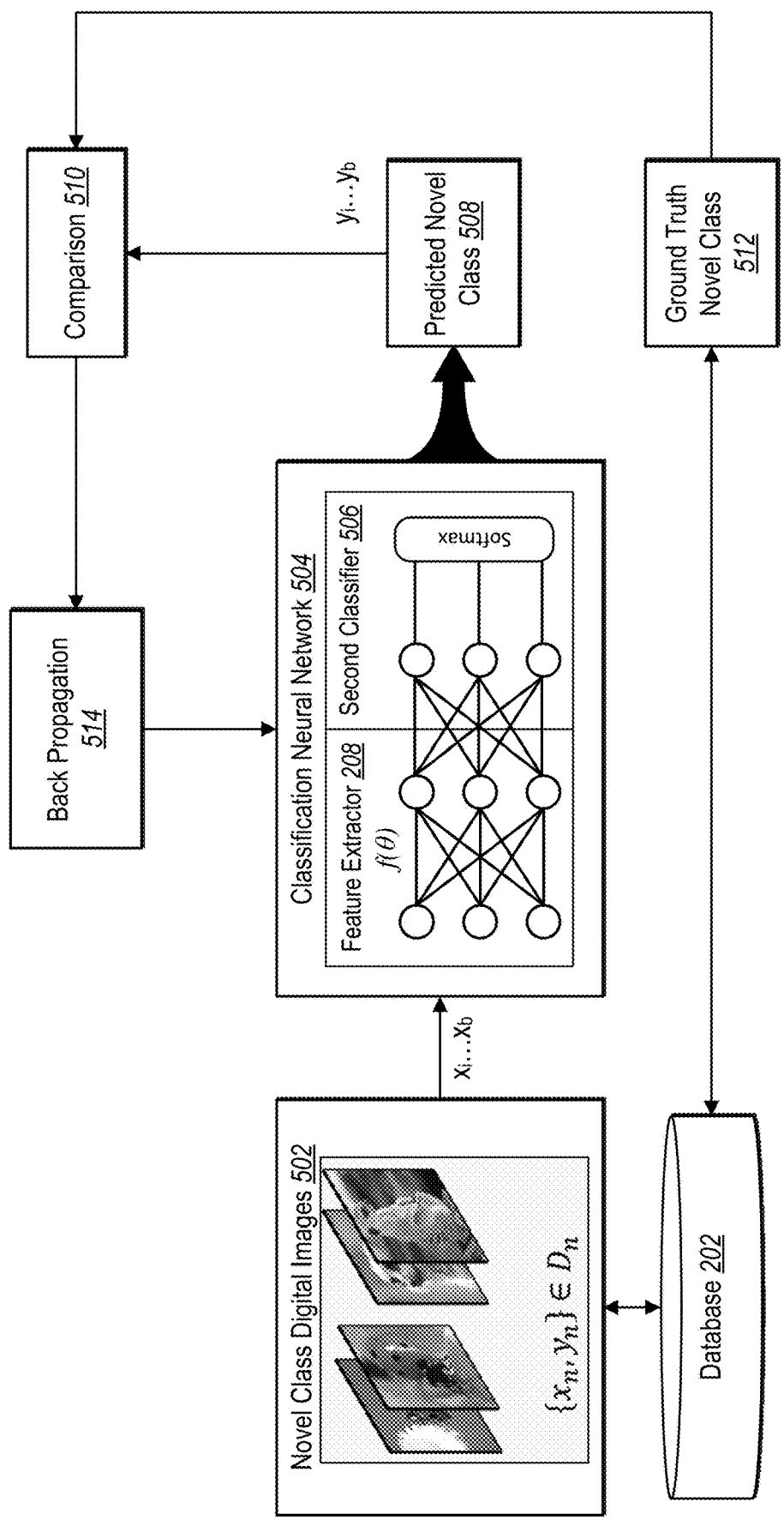
FIG. 5 illustrates an overview of training a classification neural network in accordance with one or more embodiments.

As mentioned above, in addition to the training the base neural network 304 vis-a-vis the base classes (as described in relation to FIGS. 3-4 and Algorithm 1), the digital image classification system 102 can further train a classification neural network including the feature extractor and a second classifier. In particular, digital image classification system 102 can train the classification neural network to classify digital images into additional classes not present within the base classes (e.g., for few-shot classification tasks). FIG. 5 illustrates training a classification neural network 504 including the feature extractor 208 and a second classifier 506 in accordance with one or more embodiments. In some embodiments, FIG. 5 and its description can provide the structure and/or algorithms for a step for training a second classifier to, in connection with the trained feature extractor of the base neural network, classify digital images into one or more additional classes not present in the plurality of base classes of the set of labeled digital images.

As shown in FIG. 5, the digital image classification system 102 accesses novel class digital images 502 from the database 202. In particular, the digital image classification system 102 retrieves, accesses, or receives digital images belonging to novel classes with few labeled examples. In addition, the digital image classification system 102 inputs the novel class digital images 502 into the classification neural network 504 to train the classification neural network 504 to accurately classify digital images into novel classes not present within the above-described base classes.

To this end, the digital image classification system 102 trains the classification neural network 504 based on novel class data $\mathcal{D}_n = \{(x_i, y_i): i=1, \ldots, m_n\}$ where $\{y_i \in C_n \subset C\}$ and $C_b \cup C_n = C$. Thus, there are $N_b$ base classes (where $N_b$ is the cardinality of $C_b$) and $N_n$ novel classes (where $N_n$ is the cardinality of $C_n$). The digital image classification system 102 therefore iteratively analyzes and classifies each of the novel class digital images 502, up through the novel class digital image $x_n$. For instance, the digital image classification system 102 inputs a novel class digital image $x_i$ into the classification neural network 504, whereupon the classification neural network 504 generates a predicted novel class 508 for the novel class digital image $x_i$.

To generate the predicted novel class 508 for the novel class digital image $x_i$, the digital image classification system 102 utilizes the feature extractor 208 and the second classifier 506 of the classification neural network 504. In particular, the digital image classification system 102 leverages the feature manifold learned by the feature extractor 208 and modified via manifold mixup to extract features for the novel class digital image $x_i$. Based on the extracted features, the digital image classification system 102 further applies the second classifier 506 to determine the predicted novel class 508.

In some embodiments, the second classifier 506 is a cosine classifier that the digital image classification system 102 trains to adapt to few-shot tasks. For example, the second classifier 506 can include one or more fully connected layers and a SoftMax layer for generating a cosine similarity between feature representations (e.g., feature vectors). In particular, the digital image classification system 102 utilizes the cosine classifier to determine a measure of orientation that indicates a relationship between feature vectors representing different digital images. The digital image classification system 102 utilizes the second classifier 506 to determine the predicted novel class 508 based on the cosine similarities between digital images (e.g., novel class digital images 502 and/or labeled digital images 302).

For example, the digital image classification system 102 freezes layers and parameters of the feature extractor 208 and trains an $N_n$-way cosine classifier $c_{W_n}$ (e.g., the second classifier 506) on randomly sampled images from the novel class digital images 502 in $\mathcal{D}_n$. For instance, the digital image classification system 102 utilizes the second classifier 506 to determine, with respect to individual novel classes, scores that indicate probabilities of belonging to the respective the novel classes. In some embodiments, the digital image classification system 102 determines scores Score($S_i$)

for the digital image $x_i$ based on the feature representation $f_\theta(x_i)$ of the digital image $x_i$ in accordance with:

$$W = [w_1, w_2, \ldots, w_n] \in \mathbb{R}^{d \times n}$$
$$S_i = [s_1, s_2, \ldots, s_n] \in \mathbb{R}^n$$

where $$s_j = \frac{f_\theta(x_i)^T \cdot w_j}{\|f_\theta(x_i)\| \cdot \|w_j\|}.$$

Upon determining the predicted novel class 508, the digital image classification system 102 further performs a comparison 510. Particularly, the digital image classification system 102 performs the comparison 510 to compare the predicted novel class 508 with a ground truth novel class 512. Indeed, the digital image classification system 102 obtains the ground truth novel class 512 from the database 202 by identifying a novel class to which the novel class digital image $x_i$ belongs.

In addition, the digital image classification system 102 compares the ground truth novel class 512 with the predicted novel class 508 by utilizing a loss function. For example, the digital image classification system 102 utilizes a cross entropy loss function to determine an error or measure of loss associated with the classification neural network 504. In some embodiments, the digital image classification system 102 utilizes an additional or alternative loss function such as a cosine embedding loss function.

In any event, the digital image classification system 102 determines a measure of loss associated with the classification neural network 504, and the digital image classification system 102 further performs a back propagation 514 to reduce the measure of loss. For example, the digital image classification system 102 modifies weights or parameters associated with the classification neural network 504, including parameters of the second classifier 506. By modifying the parameters of the second classifier 506, the digital image classification system 102 improves the accuracy with which the classification neural network 504 determines predicted novel classes. Thus, upon subsequent iterations, the classification neural network 504 utilizes the modified parameters to generate alternative feature representations of digital images for predicting classifications.

Indeed, the digital image classification system 102 repeats the process illustrated in FIG. 5 for novel class digital images $x_i, \ldots, x_n$ to determine corresponding novel classes $y_i, \ldots, y_n$. More particularly, for each training iteration, the digital image classification system 102 inputs a novel class digital image into the classification neural network 504, uses the classification neural network 504 to determine a predicted novel class for the digital image (by determining scores in accordance with internal parameters), compares the predicted novel class with a ground truth novel class for the digital image, and back propagates to adjust parameters of the second classifier 506 (the parameters of the feature extractor 208 are frozen) to reduce a loss resultant from the comparison. Thus, the digital image classification system 102 trains the classification neural network 504 to accurately classify digital images in few-shot tasks by identifying novel classes from few examples based on training the feature extractor 208 over base classes as part of a base neural network 304.

Once trained, the neural networks described herein can be employed to perform various different few-shot learning tasks (e.g., classification, tagging, segmentation). For example, an artificial intelligence system may employ automatic image tagging using neural networks described herein. In particular, a user may provide a few labelled instances for each class (i.e., a tag) and expect the artificial intelligence system to learn a classifier on these classes using only a few examples per class. As instance, a user can upload a very limited number of images of a particular car model with a tag label as the car model type. An artificial intelligence system using neural networks described herein can tag a large corpus of untagged images of the car in a repository. As another example, a photo management system can employ neural networks described herein to aid in filtering photos. In particular, the photo management system can employ neural networks described herein to filter photos in a collection by individuals. The photo management system employing the neural networks described herein can learn different faces quickly based on a small number of examples. As such, the neural networks described herein can simply the organization process by requiring only a small number of labelled images. Additionally, the artificial intelligence system can use the neural networks described herein to train on a first domain and then be employed on a second domain. Where the testing domain is thought of as a few shot task, and the system aims to adapt to a different data distribution using the smallest number of examples as possible.

As mentioned, the digital image classification system 102 outperforms conventional digital image systems in accurately classifying digital images. Experimenters have shown that the digital image classification system 102 outperforms conventional systems based on training over particular datasets such as mini-ImageNet, CUB, and CIFAR-FS. The mini-ImageNet dataset consists of 100 classes split into 64 base classes, 16 validation classes, and 20 novel classes. Each class has 600 samples (digital images) of size 84×84 pixels. CUB contains 200 classes with a total of 11,788 digital images of size 84×84, where the base, validation, and novel classes are split to include 100, 50, and 50 classes, respectively. The CIFAR-FS dataset is created by randomly splitting 100 classes of CIFAR-100 into 64 base classes, 16 validation classes, and 20 novel classes, where the digital images have a size of 32×32.

FIG. 6 illustrates a table representing some of the performance improvements of the digital image classification system 102 in accordance with one or more embodiments. As shown in FIG. 6, the researchers compared various networks trained using the techniques described herein to various state-of-the-art system. In particular, the researchers used a classification network trained using Manifold Mixup as described herein, a classification network trained using only rotation as described herein, and an embodiment of the digital image classification system 102—"S2M2$_R$" where the self-supervision involves rotation training.

Table in FIG. 6 indicates that the digital image classification system 102 improves over conventional state-of-the-art digital image systems such as MAML (C. Finn, P. Abbeel, and S. Levine, Model-agnostic metalearning for fast adaptation of deep networks, In Proceedings of the 34th International Conference on Machine Learning-Volume 70, pages 1126-1135, 2017), ProtoNet (J. Snell, K. Swersky, and R. Zemel, Prototypical networks for few-shot learning, In Advances in Neural Information Processing Systems, pages 4077-4087, 2017), RelationNet (F. Sung, Y. Yang, L. Zhang, T. Xiang, P. H. S. Torr, and T. M. Hospedales, Learning to compare: Relation network for few-shot learning, CoRR, 2017), LEO (A. A. Rusu, D. Rao, J. Sygnowski, O. Vinyals, R. Pascanu, S. Osindero, and R. Hadsell, Meta-learning with latent embedding optimization, In International Conference on Learning Representations, 2019), and DCO (K. Lee, S. Maji, A. Ravichandran, and S. Soatto, Metalearning with differentiable convex optimization, CoRR, 2019), using each of the above-mentioned datasets.

Indeed, based on experiments of 5-way 1-shot classification and 5-way 5-shot classification, the digital image classification system 102 results in improved accuracy over each of the listed conventional systems using each of the above datasets. For example, the digital image classification system 102 exhibits an accuracy of 83.07% classification with an error of 0.13 using the mini-ImageNet dataset in 5-way 5-shot classification, while the closest conventional system shows only 78.63% accuracy with an error of 0.46. As shown, the improvements over conventional systems are significant in some cases.

As mentioned above, the digital image classification system 102 can improve over conventional systems in additional ways as well. For example, FIG. 7A illustrates improvements of the digital image classification system 102 over conventional systems in cross-domain applications. To elaborate, the digital image classification system 102 trains the base neural network 304 and the classification neural network 504 as described above using the mini-ImageNet dataset and evaluates their performance using the CUB dataset. In other words, the digital image classification system 102 trains over one dataset and classifies digital images of a completely different dataset. As shown in FIG. 7A, the digital image classification system 102 shows improvements over conventional systems such as DCO and Baseline++, especially as the number of shots increases. Indeed, the digital image classification system 102 classifies digital images in 5-shot tasks with an accuracy nearly 16% greater than the DCO system.

In addition, FIG. 7B illustrates improvements of the digital image classification system 102 with regard to the increase of N in N-way K-shot classification tasks. More specifically, the digital image classification system 102 increases in its improvement over conventional systems as N increases. Indeed, as shown in FIG. 7B, the digital image classification system 102 exhibits a larger improvement over conventional systems with larger N values. For example, the difference between the Baseline++ system and the digital image classification system 102 in 10-way 1-shot classification is around 10%, while the different between the Baseline++ system and the digital image classification system 102 in 20-way 1-shot classification is about 20%. Thus, as N increases, the digital image classification system 102 shows more pronounced improvement over conventional systems.

Figure 8:
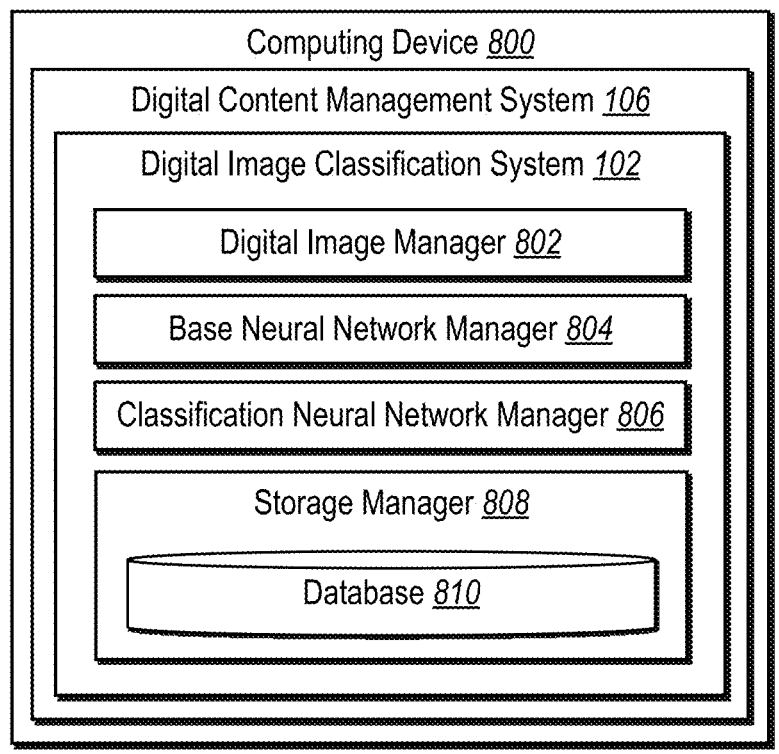
FIG. 8 illustrates a schematic diagram of a digital image classification system in accordance with one or more embodiments.

Looking now to FIG. 8, additional detail will be provided regarding components and capabilities of the digital image classification system 102. Specifically, FIG. 8 illustrates an example schematic diagram of the digital image classification system 102 on an example computing device 800 (e.g., one or more of the client device 108 and/or the server(s) 104). As shown in FIG. 8, the digital image classification system 102 may include a digital image manager 802, a base neural network manager 804, a classification neural network manager 806, and a storage manager 808.

As just mentioned, the digital image classification system 102 includes a digital image manager 802. In particular, the digital image manager 802 manages, maintains, stores, accesses, receives, retrieves, identifies, or otherwise obtains digital images such as labeled digital images and novel class digital images. For examples, the digital image manager 802 communicates with the storage manager 808 to access labeled digital images from the database 810 to provide to the base neural network manager 804 for training a base neural network. In addition, the digital image manager 802 accesses novel class digital images to provide to the classification neural network manager 806 for training a classification neural network.

In addition, the digital image classification system 102 includes a base neural network manager 804. In particular, the base neural network manager 804 manages, maintains, trains, applies, or utilizes a base neural network such as the base neural network 304. For example, the base neural network manager 804 trains a base neural network to classify labeled digital images into base classes. The base neural network manager 804 trains a feature extractor of a trained base neural network to generate a feature manifold based on self-supervised training. The base neural network manager 804 further modifies the feature manifold utilizing manifold mixup regularization.

As further shown, the digital image classification system 102 includes a classification neural network manager 806. In particular, the classification neural network manager 806 manages, maintains, trains, applies, or utilizes a classification neural network such as the classification neural network 504. For example, the classification neural network manager 806 trains a classification neural network 504 to classify digital images into novel classes based on the feature extractor trained in conjunction with the base neural network. The classification neural network manager 806 also applies a trained classification neural network including the feature extractor and a cosine classifier to classify a digital image into a novel class.

Additionally, the digital image classification system 102 includes a storage manager 808. In particular, the storage manager 808 can include one or more computing devices and memory devices for managing a database 810 (e.g., the database 114 and/or the database 202). For example, the storage manager 808 stores digital images such as labeled digital images and/or novel class digital images. In addition, the storage manager 808 stores ground truth classes for digital images such as ground truth base classes for labeled digital images and ground truth novel classes for the novel class digital images.

In one or more embodiments, each of the components of the digital image classification system 102 are in communication with one another using any suitable communication technologies. Additionally, the components of the digital image classification system 102 can be in communication with one or more other devices including one or more client devices described above. It will be recognized that although the components of the digital image classification system 102 are shown to be separate in FIG. 8, any of the subcomponents may be combined into fewer components, such as into a single component, or divided into more components as may serve a particular implementation. Furthermore, although the components of FIG. 8 are described in connection with the digital image classification system 102, at least some of the components for performing operations in conjunction with the digital image classification system 102 described herein may be implemented on other devices within the environment.

The components of the digital image classification system 102 can include software, hardware, or both. For example, the components of the digital image classification system 102 can include one or more instructions stored on a computer-readable storage medium and executable by processors of one or more computing devices (e.g., the computing device 800). When executed by the one or more processors, the computer-executable instructions of the digital image classification system 102 can cause the computing device 800 to perform the methods described herein. Alternatively, the components of the digital image classification system 102 can comprise hardware, such as a special purpose processing device to perform a certain function or group of functions. Additionally or alternatively, the components of the digital image classification system 102 can include a combination of computer-executable instructions and hardware.

Furthermore, the components of the digital image classification system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the digital image classification system 102 may be implemented as part of a stand-alone application on a personal computing device or a mobile device. Alternatively or additionally, the components of the digital image classification system 102 may be implemented in any application that allows creation and delivery of marketing content to users, including, but not limited to, applications in ADOBE EXPERIENCE MANAGER and ADOBE CREATIVE CLOUD, such as ADOBE PHOTOSHOP and ADOBE LIGHTROOM. "ADOBE," "ADOBE EXPERIENCE MANAGER," "ADOBE PHOTOSHOP," "ADOBE LIGHTROOM," and "ADOBE CREATIVE CLOUD" are trademarks of Adobe Inc. in the United States and/or other countries.

FIGS. 1-8, the corresponding text, and the examples provide a number of different systems, methods, and non-transitory computer readable media for training a classification neural network to classify digital images in few-shot tasks based on self-supervision and manifold mixup. In addition to the foregoing, embodiments can also be described in terms of flowcharts comprising acts for accomplishing a particular result. For example, FIG. 9 illustrates a flowchart of an example sequence of acts in accordance with one or more embodiments.

Figure 9:
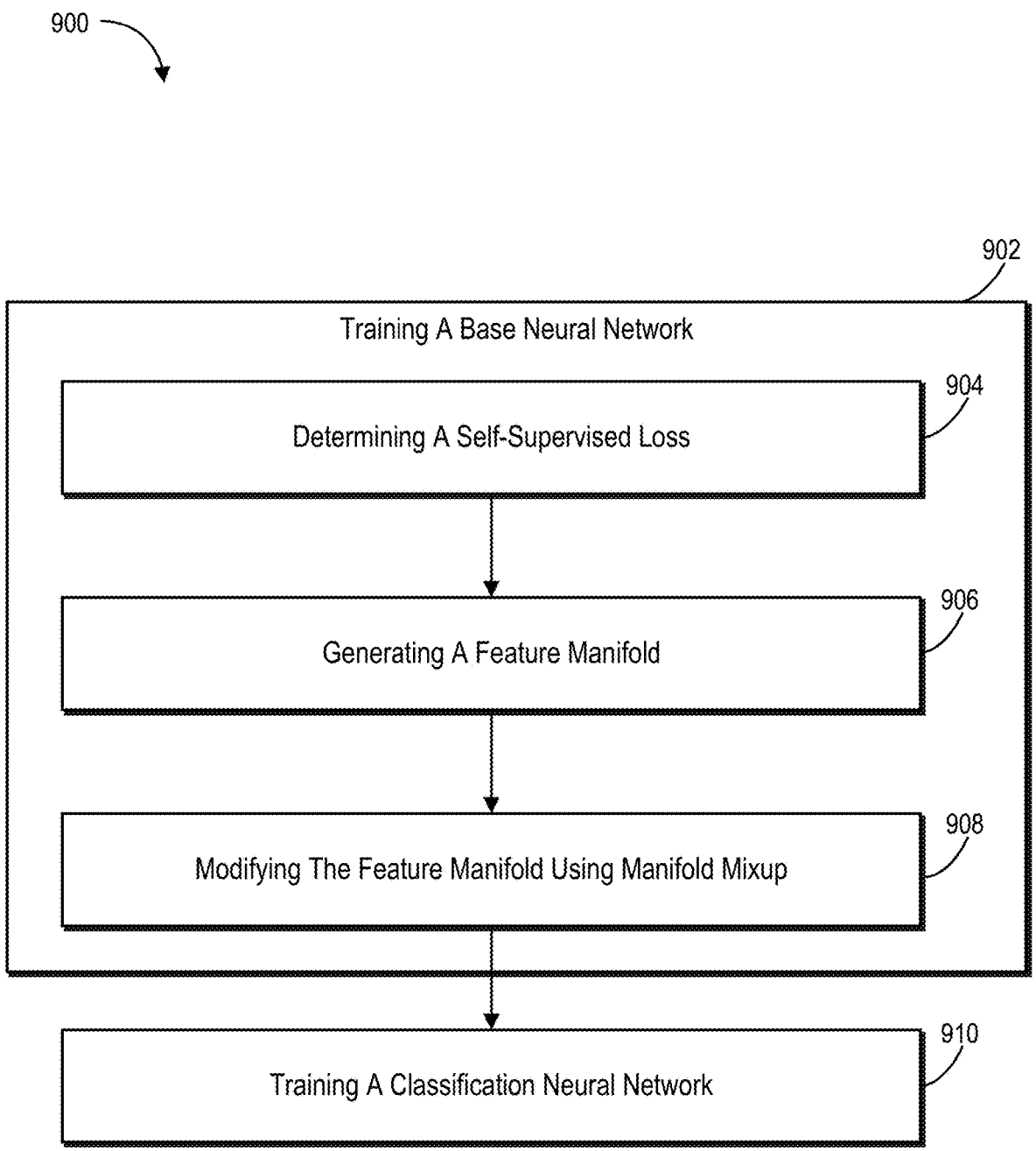
FIG. 9 illustrates a flowchart of a series of acts for training a classification neural network to classify digital images in few-shot tasks based on self-supervision and manifold mixup.

While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for training a classification neural network to classify digital images in few-shot tasks based on self-supervision and manifold mixup. For example, the series of acts 900 includes an act 902 of training a base neural network. In particular, the act 902 can involve training, based on the set of labeled digital images, the base neural network including a feature extractor and a first classifier to classify digital images into the plurality of base classes. Indeed, the act 902 can involve determining a self-supervised loss associated with the feature extractor utilizing the self-supervised training, determining a classification loss associated with a classifier of the base neural network, and generating a composite loss associated with the base neural network by combining the self-supervised loss and the classification loss. Indeed, the act 902 can involve training the base neural network using self-supervision. Self-supervision can include training a feature extractor and a first classifier of the base neural network using a rotation training process. In some embodiments, self-supervision can include training the feature extractor and the first classifier using an exemplar training process.

The act 902 can further involve multiple acts such as an act 904 of determining a self-supervised loss. In particular, the act 904 can include determining a self-supervised loss associated with the feature extractor utilizing a self-supervised training process. For example, the act 904 can involve one or more of rotating digital images input into the feature extractor by different angles and applying the feature extractor to predict which angles were applied to the rotated digital images or modifying digital images input into the feature extractor utilizing random augmentations from a set of augmentations and applying the feature extractor to predict which augmentations were applied to the modified digital images.

In addition, the act 902 can include an act 906 of generating a feature manifold. In particular, the act 906 can involve generating, utilizing the feature extractor based on the self-supervised loss, a feature manifold comprising features associated with the plurality of base classes. For example, the act 906 can involve extracting features from the set of labeled digital images utilizing the feature extractor and modifying the extracted features based on the self-supervised loss of the self-supervised training process.

Further, the act 902 can include an act 908 of modifying the feature manifold using manifold mixup. In particular, the act 908 can involve modifying, utilizing manifold mixup regularization, the feature manifold based on a manifold mixup loss associated with the feature extractor. For example, the act 908 can involve modifying the feature manifold by applying a mixing coefficient to generalize predictions of digital image classes. The act 908 can include determining the manifold mixup loss by mixing features within the feature manifold utilizing a mixing coefficient and predicting classes for digital images based on the mixed features of the feature manifold.

As shown, the series of acts 900 can also include an act 910 of training a classification neural network. In particular, the act 910 can involve training the classification neural network including the feature extractor and the second classifier to classify digital images into one or more additional classes not present in the plurality of base classes based on the modified feature manifold. The classification neural network can include parameters generated based on the composite loss associated with the base neural network. The act 910 can involve freezing parameters associated with the feature extractor learned via the self-supervised training process and modifying parameters associated with the second classifier based on the manifold mixup loss.

The series of acts 900 can also include an act of extracting features from a digital image using a feature extractor of a base neural network trained to classify digital images based on manifold mixup regularization over a feature manifold generated via self-supervised training over a set of labeled digital images corresponding to a plurality of base classes. Extracting features from the digital image can include extracting latent features from the digital image.

Additionally, the series of acts 900 can include an act of determining a classification for the digital image by processing the extracted features using a classification neural network comprising a classifier trained in connection with the feature extractor to classify digital images into one or more additional classes not present in the plurality of base classes. Determining the classification for the digital image can include processing the extracted features using a cosine classifier.

In some embodiments, the base neural network includes a first classifier and the classification neural network includes a second classifier. In these or other embodiments, the first classifier can include a linear classifier and the second classifier can include a cosine classifier.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
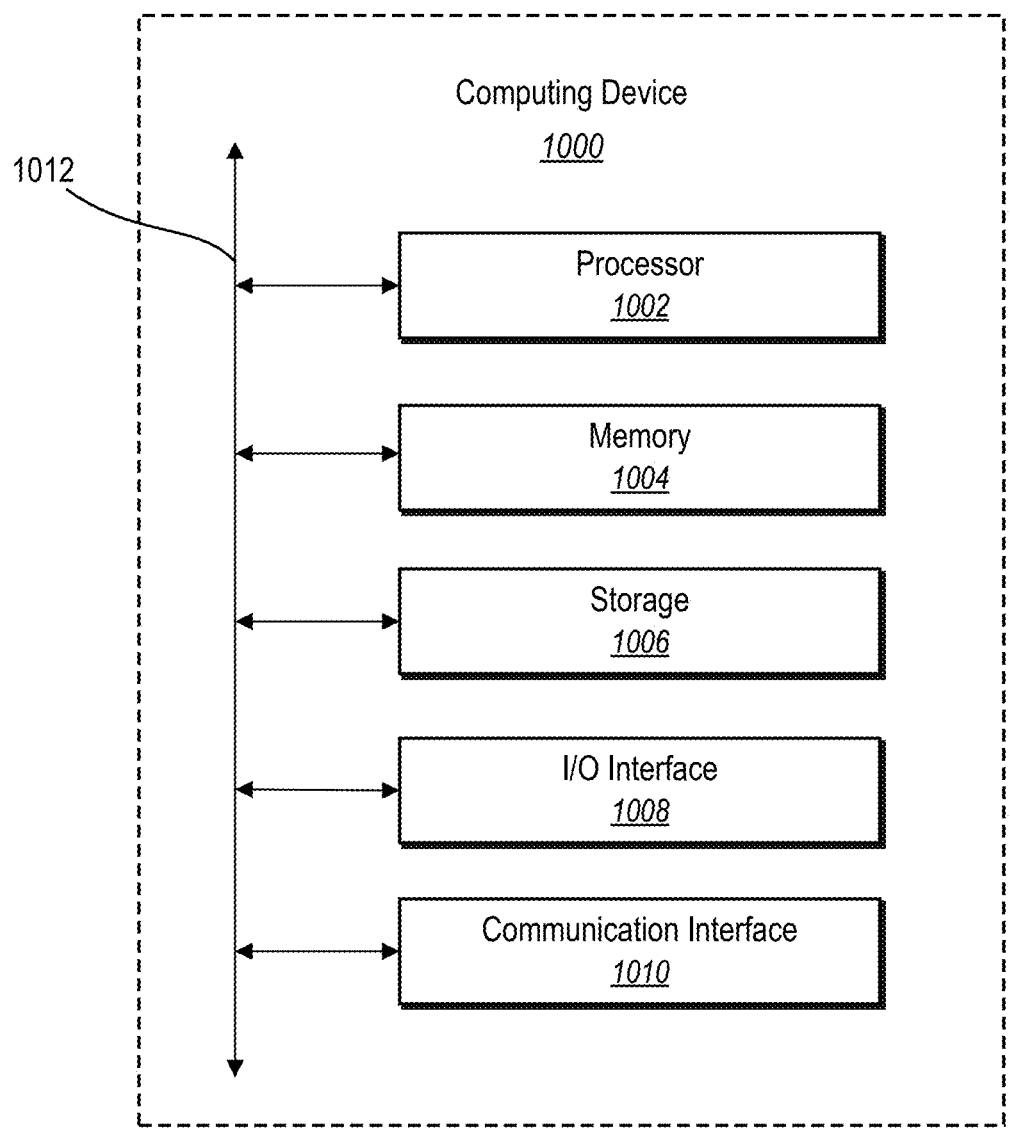
FIG. 10 illustrates a block diagram of an example computing device in accordance with one or more embodiments.

FIG. 10 illustrates, in block diagram form, an example computing device 1000 (e.g., the computing device 800, the client device 108, and/or the server(s) 104) that may be configured to perform one or more of the processes described above. One will appreciate that the digital image classification system 102 can comprise implementations of the computing device 1000. As shown by FIG. 10, the computing device can comprise a processor 1002, memory 1004, a storage device 1006, an I/O interface 1008, and a communication interface 1010. Furthermore, the computing device 1000 can include an input device such as a touchscreen, mouse, keyboard, etc. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a writing device or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
identifying a set of labeled digital images corresponding to a plurality of base classes;
performing a step for training a base neural network to classify a digital image into one of the plurality of base classes; and
performing a step for training a second classifier to classify the digital image into an additional class not present in the plurality of base classes of the set of labeled digital images.

2. The computer-implemented method of claim 1, wherein performing the step for training the base neural network comprises training a feature extractor and a first classifier of the base neural network using a rotation training process.

3. The computer-implemented method of claim 1, wherein the step for training the base neural network comprises training a feature extractor and a first classifier of the base neural network using an exemplar training process.

4. The computer-implemented method of claim 1, further comprising extracting features of the digital image by applying a feature extractor of the base neural network.

5. The computer-implemented method of claim 4, further comprising determining the additional class by applying the second classifier to the extracted features of the digital image.

6. A non-transitory computer readable medium comprising instructions that, when executed by at least one processor, cause a computing device to:
extract features from a digital image using a feature extractor of a base neural network trained to classify the digital image utilizing manifold mixup regularization to modify decision boundaries of a feature manifold generated via self-supervised training over a set of labeled digital images corresponding to a plurality of base classes, wherein modifying the decision boundaries facilitates classification into one or more additional classes not present in the plurality of base classes; and determine a classification for the digital image by processing the extracted features using a classification neural network comprising a classifier trained in connection with the feature extractor to classify the digital image into an additional class of the one or more additional classes not present in the plurality of base classes.

7. The non-transitory computer readable medium of claim 6, further comprising instructions that, when executed by the at least one processor, cause the computing device to extract the features from the digital image by extracting latent features from the digital image.

8. The non-transitory computer readable medium of claim 7, further comprising instructions that, when executed by the at least one processor, cause the computing device to determine the classification for the digital image by processing the extracted features using a cosine classifier.

9. The non-transitory computer readable medium of claim 6, wherein the self-supervised training comprises one or more of:
rotating sample digital images input into the feature extractor by different angles and applying the feature extractor to predict which angles were applied to rotate the sample digital images; or
modifying the sample digital images input into the feature extractor utilizing random augmentations from a set of augmentations and applying the feature extractor to predict which augmentations were applied to modify the sample digital images.

10. The non-transitory computer readable medium of claim 6, wherein the base neural network is trained by:
determining a self-supervised loss associated with the feature extractor utilizing the self-supervised training;
determining a classification loss associated with a classifier of the base neural network; and
generating a composite loss associated with the base neural network by combining the self-supervised loss and the classification loss.

11. The non-transitory computer readable medium of claim 10, wherein the classifier of the classification neural network comprises parameters generated based on the composite loss associated with the base neural network.

12. The non-transitory computer readable medium of claim 6, wherein the manifold mixup regularization comprises modifying the feature manifold by applying a mixing coefficient to generalize predictions of digital image classes.

13. A system comprising:
one or more memory devices comprising a set of labeled digital images corresponding to a plurality of base classes, a base neural network comprising a feature extractor and a first classifier, and a classification neural network comprising the feature extractor and a second classifier; and
one or more server devices that cause the system to:
train, based on the set of labeled digital images, the base neural network comprising the feature extractor and the first classifier to classify a digital image into one of the plurality of base classes by:
determining a self-supervised loss associated with the feature extractor utilizing a self-supervised training process;
generating, utilizing the feature extractor based on the self-supervised loss, a feature manifold comprising features associated with the plurality of base classes; and
modifying, utilizing manifold mixup regularization, the feature manifold based on a manifold mixup loss associated with the feature extractor; and
train the classification neural network comprising the feature extractor and the second classifier to classify the digital image into an additional class not present in the plurality of base classes based on the modified feature manifold.

14. The system of claim 13, wherein determining the self-supervised loss associated with the feature extractor comprises one or more of:
rotating sample digital images input into the feature extractor by different angles and applying the feature extractor to predict which angles were applied to rotate the sample digital images; or
modifying the sample digital images input into the feature extractor utilizing random augmentations from a set of augmentations and applying the feature extractor to predict which augmentations were applied to modify the sample digital images.

15. The system of claim 13, wherein generating the feature manifold comprises:
extracting features from the set of labeled digital images utilizing the feature extractor; and
modifying the extracted features based on the self-supervised loss of the self-supervised training process.

16. The system of claim 13, wherein the one or more server devices cause the system to train the classification neural network comprising the feature extractor and the second classifier to classify digital images into the one or more additional classes not present in the plurality of base classes by:
freezing parameters associated with the feature extractor learned via the self-supervised training process; and
modifying parameters associated with the second classifier based on the manifold mixup loss.

17. The system of claim 13, wherein the one or more server devices further cause the system to determine the manifold mixup loss by:
mixing features within the feature manifold utilizing a mixing coefficient; and
predicting classes for digital images based on the mixed features of the feature manifold.

18. The system of claim 13, wherein the one or more server devices further cause the system to train the base neural network by determining a classification loss associated with the first classifier.

19. The system of claim 18, wherein the one or more server devices cause the system to train the base neural network by further generating a composite loss associated the base neural network by combining the classification loss and the self-supervised loss.

20. The system of claim 13, wherein the first classifier comprises a linear classifier and the second classifier comprises a cosine classifier.

* * * * *